United States Patent
Moine et al.

(10) Patent No.: US 9,557,578 B2
(45) Date of Patent: Jan. 31, 2017

(54) METHODS FOR DETERMINING A PROGRESSIVE OPHTHALMIC LENS

(71) Applicant: Essilor International (Compagnie Générale d'Optique), Charenton-le-Pont (FR)

(72) Inventors: Jérôme Moine, Charenton-le-Pont (FR); Céline Benoit, Charenton-le-Pont (FR); Guillaume Broutin, Charenton-le-Pont (FR); Carlos Rego, Charenton-le-Pont (FR); Olivier Roussel, Charenton-le-Pont (FR)

(73) Assignee: ESSILOR INTERNATIONAL (COMPAGNIE GENERALE D'OPTIQUE), Charenton le Pont (FR)

( * ) Notice: Subject to any disclaimer, the term of this patent is extended or adjusted under 35 U.S.C. 154(b) by 0 days.

(21) Appl. No.: 14/426,441

(22) PCT Filed: Sep. 6, 2013

(86) PCT No.: PCT/EP2013/068431
§ 371 (c)(1),
(2) Date: Mar. 6, 2015

(87) PCT Pub. No.: WO2014/037482
PCT Pub. Date: Mar. 13, 2014

(65) Prior Publication Data
US 2015/0219924 A1  Aug. 6, 2015

(30) Foreign Application Priority Data

Sep. 7, 2012  (EP) .................................... 12306083

(51) Int. Cl.
*G02C 7/00* (2006.01)
*G02C 7/02* (2006.01)
*G02C 7/06* (2006.01)

(52) U.S. Cl.
CPC ............... *G02C 7/027* (2013.01); *G02C 7/028* (2013.01); *G02C 7/066* (2013.01); *G02C 7/068* (2013.01);
(Continued)

(58) Field of Classification Search
CPC ............................... G02C 7/068; G02C 7/066
(Continued)

(56) References Cited

U.S. PATENT DOCUMENTS 5,270,746 A    12/1993  Kato et al.
5,570,143 A *  10/1996  Newman ................ G02C 7/041
                                                  351/159.52

(Continued)

FOREIGN PATENT DOCUMENTS

DE    102009053467    7/2010
EP    0461624         12/1991

(Continued)

OTHER PUBLICATIONS

STIC Search Report.*

(Continued)

*Primary Examiner* — Stephone B Allen
*Assistant Examiner* — Travis Fissel
(74) *Attorney, Agent, or Firm* — Cozen O'Connor

(57) ABSTRACT

Methods for determining a progressive ophthalmic lens are described, the lens comprising a near and a far vision area, a main meridian separating the lens into a nasal and a temporal area. The method includes determining a first and a second surface of the lens, determining the second surface to provide, in combination with the first surface, vision correcting properties, and determining a spherical area on the first surface of the lens having a constant sphere value and including a far vision diopter measurement position. The far vision diopter measurement position and a near vision (Continued)

diopter measurement position have substantially the same mean sphere value. The method also includes determining the first surface to reduce the lens distortion by defining a toric area extending outside the spherical area on the first surface in at least one of the nasal and the temporal area, in which characteristics of the toric area are related to the lens astigmatism.

19 Claims, 30 Drawing Sheets

(52) U.S. Cl.
CPC ....... *G02C 2202/02* (2013.01); *G02C 2202/08* (2013.01)

(58) Field of Classification Search
USPC .............. 351/159.01, 159.05, 159.06, 159.1, 351/159.12, 159.13, 159.14, 159.16, 351/159.2, 159.21, 159.22, 159.37, 351/159.38, 159, 41, 159.42, 351/159.41–159.47, 159.52–159.54, 351/159.73, 159.77
See application file for complete search history.

(56) References Cited

U.S. PATENT DOCUMENTS

| | | | | |
|---|---|---|---|---|
| 6,231,184 | B1 * | 5/2001 | Menezes | G02C 7/061 351/159.42 |
| 6,318,859 | B1 | 11/2001 | Baudart et al. | |
| 2007/0035696 | A1 * | 2/2007 | Altheimer | G02C 7/024 351/159.42 |
| 2008/0218689 | A1 * | 9/2008 | Blum | G02C 7/06 351/159.42 |
| 2009/0326693 | A1 * | 12/2009 | Yanari | G02C 7/028 700/97 |
| 2011/0228225 | A1 * | 9/2011 | Liang | G02C 7/02 351/159.01 |
| 2012/0300172 | A1 * | 11/2012 | Berthezene | G02C 7/028 351/159.76 |

FOREIGN PATENT DOCUMENTS

| | | |
|---|---|---|
| EP | 0990939 | 4/2000 |
| EP | 2207118 | 7/2010 |
| EP | 2492740 | 8/2012 |
| WO | WO 9812590 | 3/1998 |
| WO | WO 2012007064 | 1/2012 |

OTHER PUBLICATIONS

Le Grand, Y, La distorsion en optique de lunetterie; Annales D'Optique Oculaire, Optique Physiologique Optometrie, Lunetterie, Jan. 1956, vol. 5, No. 1, pp. 1-8.

Bourdoncle, B, et al., Ray-tracings through progressive ophthalmic lenses, in: Proceedings from SPIE—The International Society for Optical Engineering, International Lens Design Conference, Jun. 11-14, 1990, Monterey, California, vol. 1354, pp. 194-199.

ISO 8980-2, Ophthalmic optics—Uncut finished spectacle lenses—Part 2: Specifications for progressive power lenses, Second edition, 2004, 14 pages.

ISO 10322-2, Ophthalmic optics—Semi-finished spectacle lens blanks—Part 2: Specifications for progressive power lens blanks, Third edition, 2006, 14 pages.

Machine translation in part of EP 0990939 published Apr. 5, 2000 (10 pgs).

Machine translation in part of WO 9812590 published Mar. 26, 1998 (41 pgs).

International Preliminary Report on Patentability and Written Opinion of the International Searching Authority, dated Mar. 10, 2015, for International Application No. PCT/EP2013/068431 (14 pages).

International Search Report dated May 9, 2014, for International Application No. PCT/EP2013/068431 (5 pages).

European Patent Office Communication for and including the European Search Report and Opinion, dated Apr. 24, 2015, for European Application No. 13771406.9 (9 pages).

* cited by examiner

Lens without misalignment

Rz misalignment

Tx misalignment

Ty misalignment

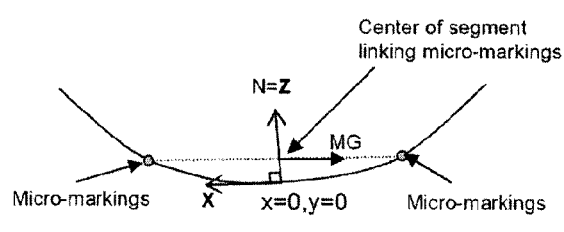
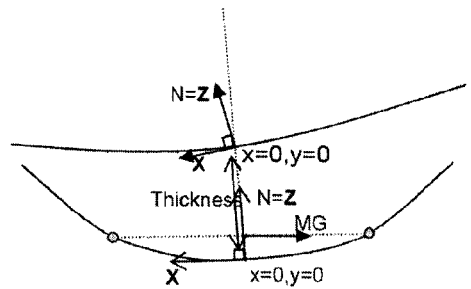
Figure 6
Figure 7
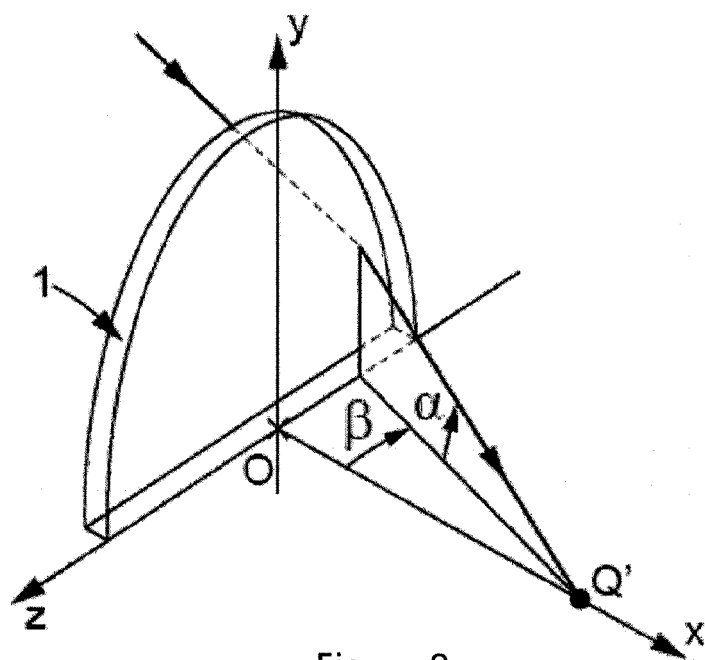
Figure 8

|  | Temporal Portion example 1 | Temporal Portion example 2 |
|---|---|---|
| Wanted axis value $\gamma_{ref}$ (°) for the average axis Γ | 135 | 135 |
| Average axis Γ (°) obtained | 126.4 | 116.5 |
| MinΓ (°) obtained | 100.2 | 100.2 |
| MaxΓ (°) obtained | 153.8 | 136.6 |
| D (mm) | 19.2 | 13 |
| Criteria Grad (°/mm) obtained | 2.8 | 2.8 |

Fig. 31

|  | Temporal Portion example 1 | Temporal Portion example 2 |
|---|---|---|
| Wanted axis value $\gamma_{ref}$ (°) for the average axis $\Gamma$ | 135 | 135 |
| Average axis $\Gamma$ (°) obtained | 126.1 | 119.8 |
| Min$\Gamma$ (°) obtained | 100.9 | 107.4 |
| Max$\Gamma$ (°) obtained | 145.5 | 135.3 |
| D (mm) | 18.0 | 14.9 |
| Criteria Grad (°/mm) obtained | 2.6 | 1.9 |

Fig. 32

C1, C2 Sphere (Diopter)

METHODS FOR DETERMINING A PROGRESSIVE OPHTHALMIC LENS

CROSS REFERENCE TO RELATED APPLICATIONS

This application is a U.S. national stage application of International Application No. PCT/EP2013/068431 filed Sep. 6, 2013, which claims the benefit of priority to EP Application No. 12306083.2, filed Sep. 7, 2012; the entirety of each of said applications is incorporated herein by reference.

FIELD OF THE INVENTION

The invention relates to a method for determining a progressive ophthalmic lens. The invention further relates to a progressive ophthalmic lens, a method for manufacturing a pair of progressive ophthalmic lenses, a set of apparatuses for manufacturing a pair of ophthalmic lenses, a set of data, a computer program product and a computer readable medium associated with such methods, lenses, apparatuses and data. The invention also relates to semi-finished lens blanks and to a method for manufacturing such blanks.

BACKGROUND OF THE INVENTION

A wearer may be prescribed a positive or negative optical power correction. For presbyopic wearers, the value of the power correction is different for far vision and near vision, due to the difficulties of accommodation in near vision. The prescription thus comprises a far-vision power value and an addition representing the power increment between far vision and near vision. The addition is qualified as prescribed addition. Ophthalmic lenses suitable for presbyopic wearers are multifocal lenses, the most suitable being progressive multifocal lenses.

The ophthalmic prescription can include a prescribed astigmatism. Such a prescription is produced by the ophthalmologist in the form of a pair formed by an axis value (in degrees) and an amplitude value (in diopters). The amplitude value represents the difference between minimal and maximal power in a given direction which enables correction of the visual defect of a wearer. According to the chosen convention, the axis represents the orientation of one of two powers with relation to a reference axis and in the sense of rotation chosen. Usually, the TABO convention is used. In this convention, the reference axis is horizontal and the sense of rotation is counterclockwise for each eye, when looking at the wearer. An axis value of +45° therefore represents an axis oriented obliquely, which when looking at the wearer, extends from the quadrant located up on the right to the quadrant located down on the left. Such an astigmatism prescription is measured on the wearer looking in far vision. The term <<astigmatism>> is used to designate the pair (amplitude, angle); despite this use not being strictly correct, this term is also used to refer to the amplitude of the astigmatism. The person skilled in the art can understand from the context which meaning is to be considered. It is also known for the person skilled in the art that the prescribed power and astigmatism of a wearer are usually called sphere SPH, cylinder CYL and axis. FIG. 1c is a schematic illustration of the prescription expressed in TABO referential desired for the left eye of a wearer. The axis of the prescription (65° here) gives the direction of the smallest power which is, in this case, 3.50 $\delta$ whereas the highest power is along the direction which is perpendicular to the axis of the prescription and its value corresponds to +3.50 $\delta$+0.25 $\delta$=3.75 $\delta$. The mean power (also called the mean sphere SM) is the arithmetical average of the smallest power and the highest power and is equal to 3.625 $\delta$.

As explained above, the most suitable lenses for presbyopic wearers are progressive multifocal lenses. However, such lenses induce optical defects that must be minimized in order to satisfy the wearer. When an image perceived by a wearer is formed through a lens, several phenomena degrading the imaging performances of a lens occur. Power defect, astigmatism defect and high order aberrations are examples of optical defects which impact the optical quality of the image, then reducing its sharpness and its contrast. The optical defects also modify the appearance of the object perceived by the wearer. Indeed, an object may appear distorted (the shape of the image is modified) and/or delocalized compared to the actual object.

When designing a progressive multifocal lens, it is therefore sought to reduce as much as possible the optical defects even though it is not possible to cancel them completely because of the power increment. Thus, it is also sought to spread the defects in such a way that the wearer's vision is the least affected by the remaining optical defects.

The person skilled in the art knows how to compensate for optical defects which comprise among others the power defect and astigmatism defect as described in EP 0990939, U.S. Pat. No. 5,270,746 (EP 0461624) and WO/1998/012590. The lens designer has to handle two contradicting constraints when compensating for the optical defects. On the one hand, he needs to design large central zones to provide the wearer with comfortable vision, when reading for instance. This can be done by displacing the optical defects to lateral zones of the vision field thereby producing important gradients in the periphery of the vision field which impact dynamic vision. On the other hand, the designer needs to limit the gradients in the periphery of the vision field to improve dynamic vision; this being detrimental to the size of the central vision zone. Known methods require a compromise between central and peripheral vision performances.

Moreover, the above-mentioned methods only consider optical criteria which first of all improve or degrade the sharpness of the image perceived by the wearer. For instance, criteria of power, astigmatism and higher order of aberration are dealt with. The lens designer will make a compromise among those criteria to limit distortion of the image perceived through the lens. Thereby, the lenses are typically a compromise between sharpness and image deformation.

If the front face surface is spherical in a full back side (FBS) lens, for example, front and back surface misalignment does not result in an optical error. Adding a toric surface to its front surface allows for reduction of the lens distortions. The greater a cylinder value of the toric surface, the higher the lens distortion reduction. However, with such a lens design. if a misalignment exists between the front and back surfaces of the lens as shown in FIG. 1a-2, FIG. 1a-3, and FIG. 1a-4, an unwanted astigmatism is produced on the lens. In particular, at a far vision diopter measurement position ("FV position") point of a wearer, it is more difficult to meet the ISO standard tolerances regarding prescribed astigmatism (see FIG. 1b).

Many conventional manufacturing laboratories for making ophthalmic lenses use standard equipment that have an alignment accuracy between the front and back surfaces that is not as high as is available with high end equipment. As shown in FIG. 1a-1, the front and back surfaces are aligned when their Z axes coincide and the respective x,y axes are not rotated relative to each other. FIG. 1a-3, FIG. 1a-4 and FIG. 1a-2, respectively, show that misalignment between the two lens surfaces can be due to translation along the X axis, with a value of Tx, translation along the Y axis, with a value of Ty, and/or rotation around the Z axis, with an angle of Rz.

According to applicable manufacturing standards, the finished lens has an astigmatism tolerance of 0.12D. This requirement must be met after all the potential sources of error have been taken into account. Misalignment is just one such potential source of error. In a conventional laboratory for manufacturing progressive lenses, the alignment accuracy is difficult to minimize without significantly modifying the conventional lens finishing process. As a result, yields for final lenses are significantly reduced when using a front toric surface.

As shown in FIG. 1b, for a tore of 1.0D, just from the Rz misalignment error due to the manufacturing process with use of the standard equipment, the astigmatism tolerance of 0.12D can be exceeded. If the tore is reduced to 0.75D, some margin exists to accommodate other potential sources of error, but the margin is quite small and, actually, is insufficient. The margin increases as the tore is further reduced to lower values. However, lower values of tore do not provide adequate lens distortion compensation. Thus, a progressive lens design is required that can accommodate the misalignment tolerances of a standard lab, provides the desired level of distortion compensation, and yet leaves a sufficient margin for other potential sources of error without exceeding the 0.12D permitted tolerance for a finished lens.

SUMMARY OF THE INVENTION

One object of the present invention is to alleviate at least partly the above mentioned drawbacks.

As a more specific object, the invention aims to improve the comfort of wearing an ophthalmic lens for the wearer for whom the lens is intended by improving the performance of the lens relative to image deformation, i.e., distortion, while providing good sharpness.

These and other objects can be attained in accordance with one aspect of the present invention directed to a method implemented by computer means, for determining a progressive ophthalmic lens with vision correcting properties related to the prescription of an individual wearer and enabling reduction of lens distortion, the lens comprising a near vision area and a far vision area, and a main meridian separating the lens into a nasal area and a temporal area, the method comprising:

providing the misalignment error (Tx) in the X axis direction of the lens due to the manufacturing process to be used to manufacture the lens, providing the misalignment error (Ty) in the Y axis direction of the lens due to the manufacturing process to be used to manufacture the lens, determining a first surface and a second surface of the lens;

determining the second surface to provide, in combination with the first surface, all of the vision correcting properties related to the prescription of the individual wearer;

determining a spherical area on the first surface of the lens having a substantially constant sphere value, and including within the spherical area a far vision diopter measurement position of the individual wearer, wherein the far vision diopter measurement position ("FV position") and a near vision diopter measurement position ("NV position") of the individual wearer have substantially the same mean sphere value; and determining the first surface to reduce the lens distortion by defining a toric area extending outside the spherical area on the first surface in at least one of the nasal area and the temporal area, wherein characteristics of the toric area are related to the lens astigmatism, wherein the spherical area has a first part and a second part, with the first part including the FV position and the second part including the NV position, said first part being separated from or continuous with the second part, wherein the size of each of the first and second parts of the spherical area is defined by a reference width 'a' and a reference height 'b', the FV or NV position being centered at its respective part of the spherical area defined by the reference distance 'a' and the reference distance 'b', wherein for the first part of the spherical area including the FV position, the reference distance 'a' is set to be greater than two times the misalignment error (Tx) in the X axis direction of the lens due to the manufacturing process, and the reference distance 'b' is set to be greater than two times a misalignment error (Ty) in the Y axis direction of the lens due to the manufacturing process, and wherein for the second part of the spherical area including the NV position, the reference distance 'a' is greater than two times the misalignment error (Tx), and the reference distance 'b' is greater than two times the misalignment error (Ty).

Advantageously, the method according to the invention provides that the first surface has a spherical area large enough to assure that the optical error due to misalignment error of the manufacturing process are maintained in the tolerances defined by the standards, such as ISO 8980-2, in particular the misalignment error around the Z axis.

Misalignment errors can be measured by any known means of the skilled person and are measured for each manufacturing process. For example, commonly measured misalignment errors can be 2 mm for misalignment errors in the X and Y axis direction and 3° for the rotation error around the Z axis.

There are different causes of error in lens manufacturing processes that generate misalignment errors, for example:
  a shift between the mold engravings and the first surface of the semi-finished lens,
  a shift between the engravings and the markings (used to block the semi-finished lens),
  a shift between the theoretical position of the first surface and its real position obtained during the blocking step of the semi-finished lens,
  a shift between the theoretical position of the second surface and its real position obtained during the second surface cutting step done in a generator.

Those errors result in a global misalignment value (described herein as Tx, Ty and Rz) that can be estimated by a skilled person in the art by characterizing the tolerances of each error for each step of the manufacturing process.

One way of obtaining the global misalignment value is to take into account the sum of all the maximum tolerance values.

For example, the first surface is the front surface. Such a front surface including a cylinder surface as well as having a spherical surface at least on a portion around the FV position of an individual wearer enables the use of current manufacturing processes and an acceptable misalignment error while also providing a lens distortion reduction.

According to an embodiment, the spherical portion further includes the NV position of the individual wearer.

According to another embodiment, the spherical portion further includes the FV and NV positions and the meridian therebetween.

According to still another embodiment, the spherical portion is further extended to ensure the stability of the optical design on a wider area than only the FV and NV positions.

Example embodiments thus provide a compromise between the spherical and toric areas, the spherical area enabling the use of current manufacturing processes, while the toric area enables a lens distortion reduction. The size and location of the spherical area depends on the process capability and the optical quality (i.e., the right prescription with the desired design and a lens distortion reduction) desired for the lens.

Example embodiments may further provide a symmetrical surface according to a YZ plane of the lens to enable use of the same front surface for each eye of a wearer. A reduction in the number of required semi-finished lenses can thereby be achieved.

According to further embodiments which can be considered alone or in combination:

the nasal area and the temporal area are symmetrical to each other relative to a YZ plane, and/or the spherical area of the lens comprises a main spherical area including therein the first part being continuous with the second part, said main spherical area including therein the FV position and the NV position of an individual wearer, as well as the meridian therebetween, an inset 'e' defines a distance in the X axis direction between the FV position and the NV position of the individual wearer, a length 'L' defines a distance in the Y axis direction between the FV position and the NV position of the individual wearer, from the FV position, a reference distance 'c' defines a distance that the spherical area extends in the X axis direction from the FV position toward the temporal edge of the lens, and a reference distance 'd' defines a distance that the spherical area extends in the Y axis direction from the FV position toward the top edge of the lens, from the NV position, the reference distance 'c' defines a distance that the spherical area extends in the X axis from the NV position toward the nasal edge of the lens, and the reference distance 'd' defines a distance that the spherical area extends in the Y axis direction from the NV position toward the bottom edge of the lens, and the reference distance 'c' is set to be greater than the misalignment error (Tx) in the X axis direction of the lens due to the manufacturing process, and the reference distance 'd' is set to be greater than the misalignment error (Ty) in the Y axis direction of the lens due to the manufacturing process; and/or the spherical area of the first surface of the lens comprises the main spherical area, and first and second extensions into the nasal and temporal areas in the far vision area of the lens, sizes of the first extension and the second extension are each defined by reference distances 'g' and 'f', the first extension of the spherical area extends in the temporal area in the far vision area of the lens from the main area of the spherical area by the reference distance 'f' in the X axis direction from an edge of the main spherical area defined by the reference distance 'c' at the FV position toward the temporal edge of the lens, and the first extension of the spherical area extends in the temporal area in the far vision area of the lens by the reference distance 'g' in the Y axis direction from a top of the main spherical area defined by the reference distance 'd' at the FV position toward the bottom of the lens, the second extension of the spherical area extends in the nasal area in the far vision area of the lens by the reference distance 'f' in the X axis direction from an edge of the main spherical area defined by the inset distance 'e' added to the reference distance 'c' at the FV position toward a nasal edge of the lens, and the second extension of the spherical area extends in the nasal area in the far vision area of the lens by the reference distance 'g' in the Y axis direction from a top of the main spherical area defined by the reference distance 'd' at the FV position toward the bottom of the lens, and the reference distance 'c' is greater than the misalignment error (Tx) in the X axis direction of the lens, the reference distance 'd' is greater than the misalignment error (Ty) in the Y axis direction of the lens, the reference distance 'f' is greater than 5 mm, and the reference distance 'g' is greater than 5 mm; and/or the spherical area of the lens comprises the main spherical area, the first and second extensions into the nasal and temporal areas in the far vision area of the lens, and third and fourth extensions into the nasal and temporal areas in the near vision area of the lens, with the area of the third and fourth being defined by reference distances 'i' and 'h', the third extension of the spherical area extends into the temporal area in the near vision area of the lens by the reference distance 'h' in the X axis direction from an edge of the main spherical area defined by the inset distance 'e' and the reference distance 'c' from the FV position toward a temporal edge of the lens, and the third extension of the spherical area extends in the temporal area in the near vision area of the lens by the reference distance 'i' in the Y axis direction from a bottom of the main spherical area defined by the reference distance 'd' from the NV position, the fourth extension of the spherical area extends into the nasal area in the near vision area of the lens by the reference distance 'h' in the X axis direction from an edge of the main spherical area defined by the reference distance 'c' toward a nasal edge of the lens, and the fourth extension of the spherical area extends in the nasal area in the near vision area of the lens by the reference distance 'i' in the Y axis direction from the bottom of the main spherical area defined by the reference distance 'd' from the NV position, and the reference distance 'h' is greater than 2 mm, and the reference distance 'i' is greater than 5 mm; and/or the spherical area further includes the NV position; and/or the spherical area further includes the main meridian; and/or a cylinder value of the toric area increases from a portion of the toric area adjacent to the spherical area to an edge of the lens; and/or the first surface is non-rotationally symmetrical; and/or the toric area extends within the temporal area; and/or the method further comprises the steps of:

defining a target optical function suited to the individual wearer, the target optical function defining, for each gaze direction when the lens is worn, a refractive power ($P_{\alpha,\beta}$), a module of astigmatism ($Ast_{\alpha,\beta}$) and an axis of astigmatism ($\gamma_{\alpha,\beta}$), each gaze direction corresponding to a lowering angle ($\alpha$) and to an azimuth angle ($\beta$), wherein the module of astigmatism and the axis of astigmatism refer to the prescribed astigmatism, or the total astigmatism, or the residual astigmatism;

wherein each of the first surface of the lens and the second surface of the lens having at each point a mean sphere value (SPHmean), a cylinder value (CYL) and a cylinder axis ($\gamma_{AX}$);

defining at least one first portion (Portion1) in the temporal area the first portion having an area of at least 25 mm² and at least one second portion (Portion2) in the nasal area the second portion having an area of at least 25 mm²;

for at least one of the first portion (Portion1) and the second portion (Portion2) of the first surface, determining a reference axis of astigmatism $\gamma_{ref}$ that is the average axis of astigmatism of the target optical function for gaze directions intersecting the first surface over the at least one considered portion of the first surface;

for at least one of the first portion (Portion1) and the second portion (Portion2) of the first surface, determining a cylinder axis value $\gamma_{AXi}$ for each point i of the considered portion presenting a cylinder value greater than 0.25D, $\gamma_{AXi}$ being defined in such a way that the sphere value (SPH($\gamma_{AXi}$)) along the cylinder axis $\gamma_{AXi}$ is greater than the sphere value (SPH($\perp\gamma_{AXi}$)) along a perpendicular axis to the cylinder axis $\gamma_{AXi}$ (SPH($\gamma_{AXi}$)>SPH($\perp\gamma_{AXi}$));

for at least one of the first portion (Portion1) and the second portion (Portion2) of the first surface, determining an average cylinder axis value $\Gamma$, defined as the following expression (1), where N is the total number of points considered in the portion, $$\Gamma = \frac{\sum_{i=1}^{N} \gamma_{AX_i}}{N}, \quad (1)$$

for at least one of the first portion (Portion1) and the second portion (Portion2) of the first surface, determining a minimum cylinder axis value Min$\Gamma$ and a maximum cylinder axis value Max$\Gamma$ among all the N axis values $\gamma_{AXi}$ considered;

for at least one of the first portion (Portion1) and the second portion (Portion2) of the first surface, determining a distance value D, defined as the distance in mm between the point of the considered portion presenting the minimum axis value and the point of the considered portion presenting the maximum axis value;

for at least one of the first portion (Portion1) and the second portion (Portion2) of the first surface, determining a gradient value (Grad) of the cylinder axis as the following expression (2):

$$Grad = \frac{Max\Gamma - Min\Gamma}{D}, \quad (2)$$

modifying the first surface so that on at least one of the first and second portions, the following conditions apply:
Condition 1: the average cylinder axis value $\Gamma$ determined for the respective at least one portion is between +20° and −20° of the reference axis of astigmatism $\gamma_{ref}$ for such portion, and
Condition 2: the gradient value (Grad) of the cylinder axis determined for the respective at least one portion is less than 5°/mm over the considered portion; and/or
the gradient value (Grad) of the cylinder axis is less than 3°/mm over the considered portion; and/or the gradient value (Grad) of the cylinder axis is less than 2°/mm over the considered portion.

The invention further relates to a computer program product comprising one or more stored sequences of instruction that is accessible to a processor and which, when executed by the processor, causes the processor to carry out the steps of any, for example all of the steps, of the method according to the invention.

The invention also concerns a computer readable medium carrying out one or more sequences of instructions of the computer program product of the invention.

The invention further relates to a set of data comprising data relating to a first surface of a lens determined according to the method of the invention.

The invention also relates to a method for manufacturing a progressive ophthalmic lens, comprising the steps of:
providing data relative to the eyes of an individual wearer;
transmitting data relative to the individual wearer;
determining the first surface of a lens according to the method for determining a progressive ophthalmic lens according to the invention;
transmitting data relative to the first surface;
carrying out an optical optimization of the lens based on the transmitted data relative to the first surface;
transmitting the result of the optical optimization; and
manufacturing the progressive ophthalmic lens according to the result of the optical optimization.

The invention further relates to a set of apparatuses for manufacturing a progressive ophthalmic lens, wherein the apparatuses are adapted to carry out steps of the method according to the invention.

The invention also relates to a progressive ophthalmic lens with vision correcting properties related to the prescription of an individual wearer and enabling reduction of lens distortion, the lens comprising a near vision area and a far vision area, and a main meridian separating the lens into a nasal area and a temporal area, the lens comprising:
a first surface and a second surface, wherein the second surface is configured to provide, in combination with the first surface, all of the vision correcting properties related to the prescription of the individual wearer;
a spherical area on the first surface of the lens having a substantially constant sphere value, and including within the spherical area a far vision diopter measurement position of the individual wearer, wherein the far vision diopter measurement position ("FV position") and a near vision diopter measurement position ("NV position") of the individual wearer have substantially the same mean sphere value; and
a toric area on the first surface to reduce the lens distortion, said toric area extending outside the spherical area on the first surface in at least one of the nasal area and the temporal area, wherein characteristics of the toric area are related to the lens astigmatism,
wherein the progressive ophthalmic lens has when being worn and for each gaze direction, a refractive power ($P_{\alpha,\beta}$), a module of astigmatism ($Ast_{\alpha,\beta}$) and an axis of astigmatism ($\gamma_{\alpha,\beta}$), each gaze direction corresponding to a lowering angle ($\alpha$) and to an azimuth angle ($\beta$), wherein the module of astigmatism and the axis of astigmatism refer to the prescribed astigmatism, or the total astigmatism, or the residual astigmatism; the lens comprising:
wherein each of the first surface and the second surface having at each point a mean sphere value (SPHmean), a cylinder value (CYL) and a cylinder axis ($\gamma_{AX}$);
wherein the first surface comprises:
at least one first portion (Portion1) in the temporal area the first portion having an area of at least 25 mm² and at least one second portion (Portion2) in the nasal area the second portion having an area of at least 25 mm$^2$;

for at least one of the first portion (Portion1) and the second portion (Portion2) of the first surface, a reference axis of astigmatism $\gamma_{ref}$ being the average axis of astigmatism of the target optical function for gaze directions intersecting the first surface over a considered portion of the first surface;

for at least one of the first portion (Portion1) and the second portion (Portion2) of the first surface, a cylinder axis value $\gamma_{AXi}$ for each point i of the considered portion presenting a cylinder value greater than 0.25D, $\gamma_{AXi}$ being defined in such a way that the sphere value (SPH($\gamma_{AXi}$)) along the cylinder axis $\gamma_{AXi}$ is greater than the sphere value (SPH($\perp\gamma_{AXi}$)) along a perpendicular axis to the cylinder axis $\gamma_{AXi}$ (SPH($\gamma_{AXi}$)>SPH($\perp\gamma_{AXi}$));

for at least one of the first portion (Portion1) and the second portion (Portion2) of the first surface, an average cylinder axis value $\Gamma$, defined as the following expression (1), where N is the total number of points considered in the portion, $$\Gamma = \frac{\sum_{i=1}^{N} \gamma_{AXi}}{N}, \quad (1)$$

for at least one of the first portion (Portion1) and the second portion (Portion2) of the first surface, a minimum cylinder axis value Min$\Gamma$ and a maximum cylinder axis value Max$\Gamma$ among all the N axis values $\gamma_{AXi}$ considered;

for at least one of the first portion (Portion1) and the second portion (Portion2) of the first surface, a distance value D, defined as the distance in mm between the point of the considered portion presenting the minimum axis value and the point of the considered portion presenting the maximum axis value;

for at least one of the first portion (Portion1) and the second portion (Portion2) of the first surface, a gradient value (Grad) of the cylinder axis as the following expression (2):

$$Grad = \frac{Max\Gamma - Min\Gamma}{D}, \quad (2)$$

wherein for the first surface on at least one of the first and second portions, the following conditions apply:
  Condition 1: The average cylinder axis value $\Gamma$ determined for the respective at least one portion is between +20° and −20° of the reference axis of astigmatism $\gamma_{ref}$ for such portion, and
  Condition 2: the gradient value (Grad) of the cylinder axis determined for the respective at least one portion is less than 5°/mm over the considered portion.

The invention also relates to a method for manufacturing a semi-finished lens blank having a near vision area and a far vision area, and a main meridian separating the lens into a nasal area and a temporal area, the method comprising:

determining a first surface and a second unfinished surface of the semi-finished lens;

determining a spherical area on the first surface of the semi-finished lens having a substantially constant sphere value, and including within the spherical area a far vision diopter measurement position of the individual wearer, wherein the far vision diopter measurement position ("FV position") and a near vision diopter measurement position ("NV position") of the individual wearer have substantially the same mean sphere value;

determining the first surface to reduce distortion of a lens to be manufactured from the semi-finished lens by defining a toric area extending outside the spherical area on the first surface in at least one of the nasal area and the temporal area, wherein characteristics of the toric area are related to the lens astigmatism;

defining a target optical function suited to a predetermined range of prescriptions for individual wearers, the target optical function defining, for each gaze direction when the lens is worn, a refractive power ($P_{\alpha,\beta}$), a module of astigmatism ($Ast_{\alpha,\beta}$) and an axis of astigmatism ($\gamma_{\alpha,\beta}$), each gaze direction corresponding to a lowering angle ($\alpha$) and to an azimuth angle ($\beta$), wherein the module of astigmatism and the axis of astigmatism refer to the prescribed astigmatism, or the total astigmatism, or the residual astigmatism;

wherein the first surface of the lens has at each point a mean sphere value (SPHmean), a cylinder value (CYL) and a cylinder axis ($\gamma_{AX}$);

defining at least one first portion (Portion1) in the temporal area the first portion having an area of at least 25 mm$^2$ and at least one second portion (Portion2) in the nasal area the second portion having an area of at least 25 mm$^2$;

for at least one of the first portion (Portion1) and the second portion (Portion2) of the first surface, determining a reference axis of astigmatism $\gamma_{ref}$ that is the average axis of astigmatism of the target optical function for gaze directions intersecting the first surface over a considered portion of the first surface;

for at least one of the first portion (Portion1) and the second portion (Portion2) of the first surface, determining a cylinder axis value $\gamma_{AXi}$ for each point i of the considered portion presenting a cylinder value greater than 0.25D, $\gamma_{AXi}$ being defined in such a way that the sphere value (SPH($\gamma_{AXi}$)) along the cylinder axis $\gamma_{AXi}$ is greater than the sphere value (SPH($\perp\gamma_{AXi}$)) along a perpendicular axis to the cylinder axis $\gamma_{AXi}$ (SPH($\gamma_{AXi}$)>SPH($\perp\gamma_{AXi}$));

for at least one of the first portion (Portion1) and the second portion (Portion2) of the first surface, determining an average cylinder axis value $\Gamma$, defined as the following expression (1), where N is the total number of points considered in the portion, $$\Gamma = \frac{\sum_{i=1}^{N} \gamma_{AXi}}{N}, \quad (1)$$

for at least one of the first portion (Portion1) and the second portion (Portion2) of the first surface, determining a minimum cylinder axis value Min$\Gamma$ and a maximum cylinder axis value Max$\Gamma$ among all the N axis values $r\gamma_{AXi}$ considered;

for at least one of the first portion (Portion1) and the second portion (Portion2) of the first surface, determining a distance value D, defined as the distance in mm between the point of the considered portion presenting the minimum axis value and the point of the considered portion presenting the maximum axis value;

for at least one of the first portion (Portion1) and the second portion (Portion2) of the first surface, determining a gradient value (Grad) of the cylinder axis as the following expression (2):

$$Grad = \frac{\text{Max}\Gamma - \text{Min}\Gamma}{D}, \quad (2)$$

modifying the first surface so that on at least one of the first and second portions, the following conditions apply:

Condition 1: The average cylinder axis value $\Gamma$ determined for the respective at least one portion is between +20° and −20° of the reference axis of astigmatism $\gamma_{ref}$ for such portion, and Condition 2: the gradient value (Grad) of the cylinder axis determined for the respective at least one portion is less than 5°/mm over the considered portion; and surfacing or molding the first surface.

The invention further relates to a semi-finished lens blank manufactured according to the method of manufacturing a semi-finished lens blank according to the invention.

Another aspect of the invention also relates to a computer program product comprising one or more stored sequence of instruction that is accessible to a processor and which, when executed by the processor, causes the processor to carry out the steps of a method according to an embodiment of the invention.

Another aspect of the invention also relates to a computer readable medium carrying out one or more sequences of instructions of the computer program product according to an embodiment of the invention.

Another aspect of the invention further relates to a set of data comprising data relating to a first surface of a lens determined according to an embodiment of the method of the invention.

Another aspect of the invention also relates to a method for manufacturing a progressive ophthalmic lens, comprising the steps of:

providing data relative to the eyes of a wearer, transmitting data relative to the wearer, determining a first surface of a lens according to an embodiment of the method of the invention, transmitting data relative to the first surface, carrying out an optical optimization of the lens based on the transmitted data relative to the first surface, transmitting the result of the optical optimization, manufacturing the progressive ophthalmic lens according to the result of the optical optimization.

Another aspect of the invention further relates to a set of apparatuses for manufacturing a progressive ophthalmic lens, wherein the apparatuses are adapted to carry out steps of such method.

Further features and advantages of the invention will appear from the following description of embodiments of the invention, given as non-limiting examples, with reference to the accompanying drawings listed hereunder.

BRIEF DESCRIPTION OF THE DRAWINGS

For more complete understanding of the features and advantages described herein, reference is now made to a description of the invention along with accompanying figures, wherein:

FIGS. 6 and 7 show referential defined with respect to micro-markings, for a surface bearing micro-markings and for a surface not bearing the micro-markings respectively;

FIGS. 8 and 9 show, diagrammatically, optical systems of eye and lens;

FIG. 30a shows a cylinder axis distribution map with the area considered for an axis evaluation shown in FIG. 29a;

FIG. 31 shows a chart for calculated parameters of the lens embodiment shown in FIGS. 41 to 44;

FIG. 32 shows a chart for calculated parameters of the lens embodiments shown in FIGS. 33 to 40;

Figures 1, 1A:
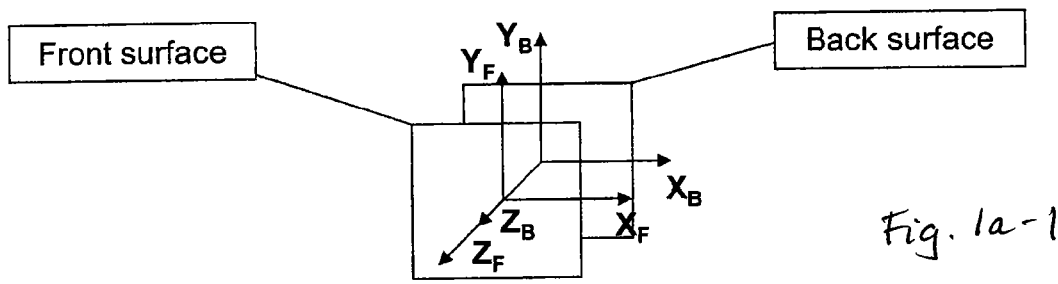
FIG. 1a depicts a misalignment between front and back surfaces of an ophthalmic lens.

It can be appreciated that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION OF PREFERRED EMBODIMENTS

A method for determining a progressive ophthalmic lens is proposed. This method enables an improved distortion without degrading the performance in term of correction of the optical power and astigmatism. This results in an increased comfort for the wearer.

A progressive lens comprises at least one but preferably two non-rotationally symmetrical aspheric surfaces, for instance but not limited to, progressive surface, regressive surface, toric or atoric surfaces.

As is known, a minimum curvature $CURV_{min}$ is defined at any point on an aspherical surface by the formula (3):

$$CURV_{min} = \frac{1}{R_{max}}, \tag{3}$$

where $R_{max}$ is the local maximum radius of curvature, expressed in meters and $CURV_{min}$ is expressed in diopters.

Similarly, a maximum curvature $CURV_{max}$ can be defined at any point on an aspheric surface by the formula (4):

$$CURV_{max} = \frac{1}{R_{min}}, \tag{4}$$

where $R_{min}$ is the local minimum radius of curvature, expressed in meters and $CURV_{max}$ is expressed in diopters.

It can be noticed that when the surface is locally spherical, the local minimum radius of curvature $R_{min}$ and the local maximum radius of curvature $R_{max}$ are the same and, accordingly, the minimum and maximum curvatures $CURV_{min}$ and $CURV_{max}$ are also identical. When the surface is aspherical, the local minimum radius of curvature $R_{min}$ and the local maximum radius of curvature $R_{max}$ are different.

From these expressions of the minimum and maximum curvatures $CURV_{min}$ and $CURV_{max}$, the minimum and maximum spheres labeled $SPH_{min}$ and $SPH_{max}$ can be deduced according to the kind of surface considered.

When the surface considered is the object side surface (also referred to as the front surface), the expressions (5) and (6) are the following:

$$SPH_{min} = (n-1) * CURV_{min} \tag{5}$$
$$= \frac{n-1}{R_{max}}$$

and $$SPH_{max} = (n-1) * CURV_{max}, \tag{6}$$
$$= \frac{n-1}{R_{min}}$$

where n is the index of the constituent material of the lens.

If the surface considered is an eyeball side surface (also referred to as the back surface), the expressions (7) and (8) are the following:

$$SPH_{min} = (1-n) * CURV_{min} \tag{7}$$
$$= \frac{1-n}{R_{max}}$$

and $$SPH_{max} = (1-n) * CURV_{max}, \tag{8}$$
$$= \frac{1-n}{R_{min}}$$

where n is the index of the constituent material of the lens.

As is well known, a mean sphere $SPH_{mean}$ at any point on an aspherical surface can also be defined by the formula (9):

$$SPH_{mean} = \frac{1}{2}(SPH_{min} + SPH_{max}). \tag{9}$$

The expression of the mean sphere therefore depends on the surface considered: if the surface is the object side surface, then $$SPH_{mean} = \frac{n-1}{2}\left(\frac{1}{R_{min}} + \frac{1}{R_{max}}\right); \quad (10)$$

and if the surface is an eyeball side surface, then $$SPH_{mean} = \frac{1-n}{2}\left(\frac{1}{R_{min}} + \frac{1}{R_{max}}\right), \quad (11)$$

A cylinder CYL is also defined by the formula (12), $$CYL = |SPH_{max} - SPH_{min} \quad (12).$$

The characteristics of any aspherical face of the lens may be expressed by the local mean spheres and cylinders. A surface can be considered as locally aspherical when the cylinder is at least 0.25 diopters.

Figures 1, 1A, 2:
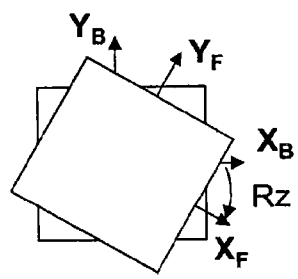
FIG. 2 illustrates the astigmatism axis γ of a lens in the TABO convention.

For an aspherical surface, a local cylinder axis $\gamma_{AX}$ may further be defined. FIG. 2 illustrates the astigmatism axis $\gamma$ as defined in the TABO convention and FIG. 3 illustrates the cylinder axis $\gamma_{AX}$ in a convention defined to characterize an aspherical surface.

The cylinder axis $\gamma_{AX}$ is the angle of the orientation of the maximum curvature $CURV_{max}$ with relation to a reference axis and in the chosen sense of rotation. In the above defined convention, the reference axis is horizontal (the angle of this reference axis is 0°) and the sense of rotation is counter-clockwise for each eye, when looking at the wearer) ($0° \leq \gamma_{AX} \leq 180°$). An axis value for the cylinder axis $\gamma_{AX}$ of +45° therefore represents an axis oriented obliquely, which when looking at the wearer, extends from the quadrant located up on the right to the quadrant located down on the left.

Figures 1, 1A, 2, 3:
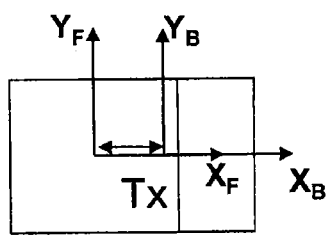
FIG. 3 illustrates the cylinder axis $\gamma_{AX}$ in a convention used to characterize an aspherical surface.
Figures 1, 1A, 2, 3, 4:
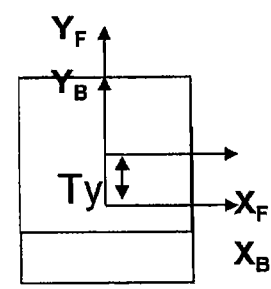
FIG. 4 illustrates the local sphere along any axis.
Figure 1B:
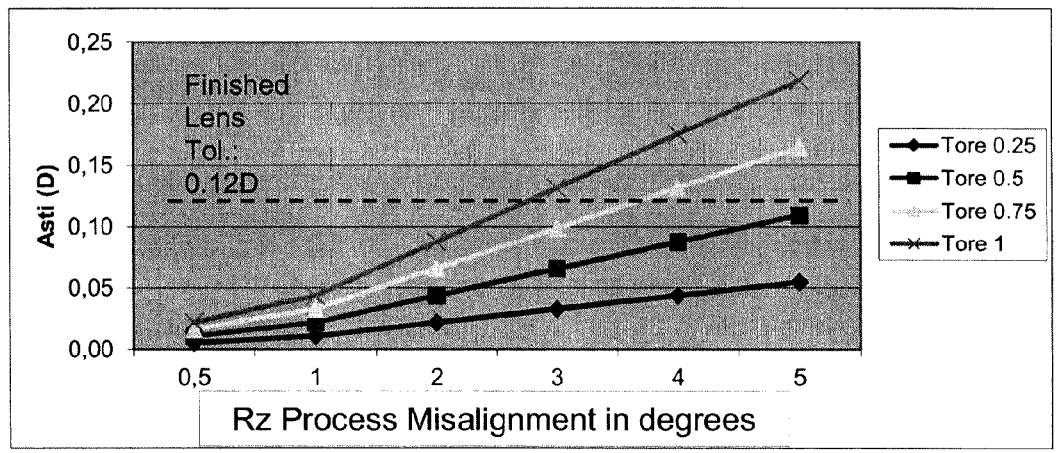
FIG. 1b depicts a graph showing how the lens astigmatism varies as a function of tore and misalignment relative to the ISO standard tolerance regarding prescribed astigmatism.
Figure 1C:
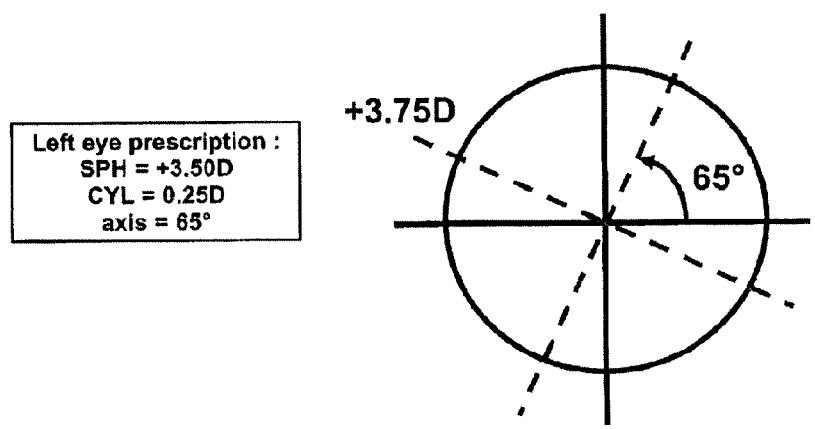
FIG. 1c depicts a schematic illustration of the prescription desired for the left eye of a wearer expressed in TABO convention.
Figure 2:
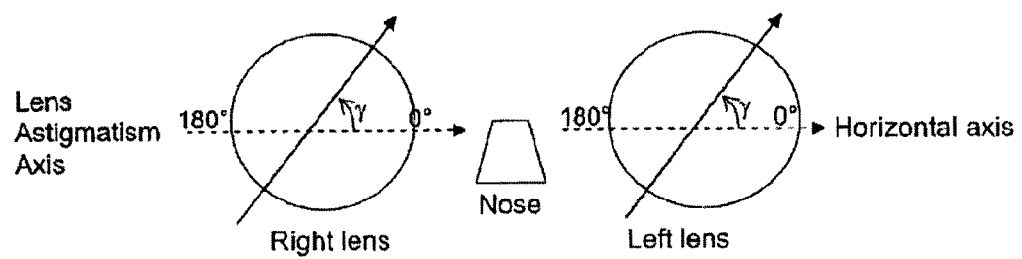
Figure 3:
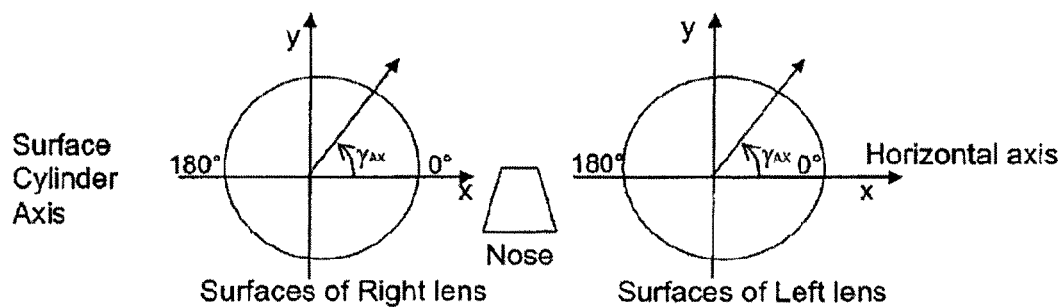
Figure 4:
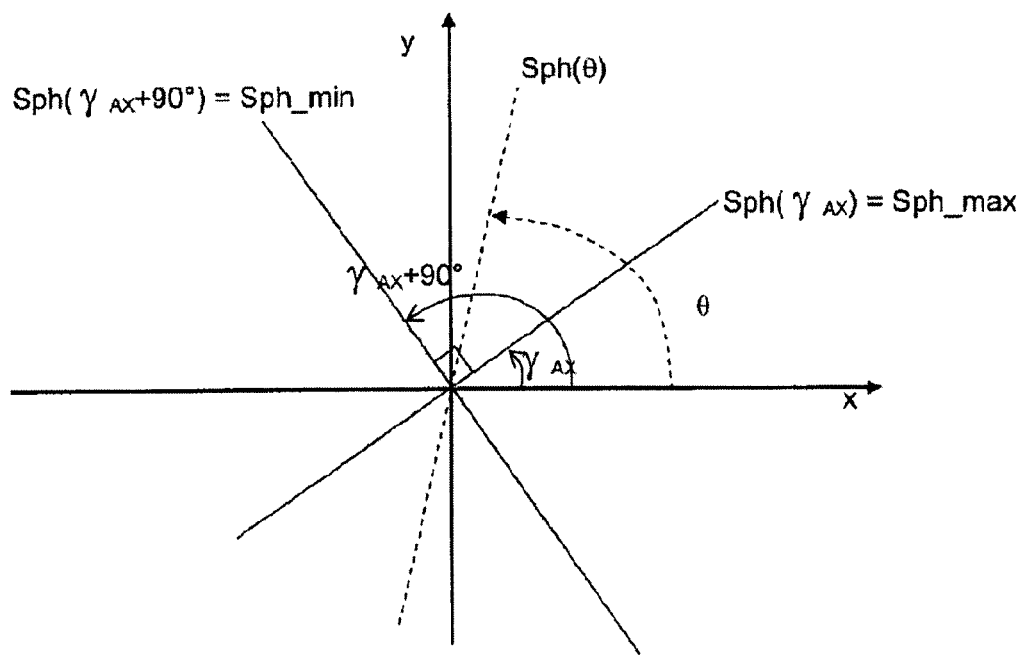

In addition, based on the knowledge of the value of the local cylinder axis $\gamma_{AX}$, Gauss formula (13) enables expression of the local sphere SPH along any axis θ, θ being a given angle in the referential defined in FIG. 3. The axis θ is shown in FIG. 4.

$$SPH(\theta) = SPH_{max}\cos^2(\theta - \gamma_{AX}) + SPH_{min}\sin^2(\theta - \gamma_{AX}) \quad (13).$$

As expected, when using the Gauss formula, SPH $(\gamma_{AX}) = SPH_{max}$ and SPH $(\gamma_{AX} + 90°) = SPH_{min}$.

Figure 5:
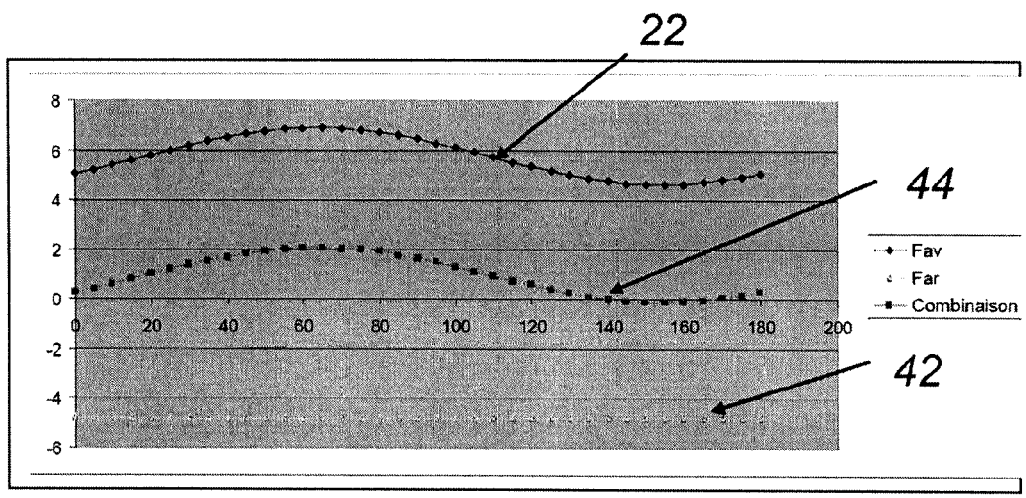
FIG. 5 is an illustration of the variation of a local sphere value in accordance with Gauss Formula.

FIG. 5 is an illustration of such variation for an example of a point of the object surface. This is the curve 22. (An explanation of the other curves depicted in this drawing is provided below.) In this particular case, the maximum sphere is 7.0 δ, the minimum sphere is 5.0 δ and $\gamma_{AX} = 65°$.

The Gauss formula can also be expressed in terms of curvature so that the curvature CURV along each axis forming an angle θ with the horizontal axis in accordance with (14):

$$CURV(\theta) = CURV_{max}\cos^2(\theta - \gamma_{AX}) + CURV_{min}\sin^2(\theta - \gamma_{AX}) \quad (14).$$

A surface may thus be locally defined by a triplet constituted by the maximum sphere $SPH_{max}$, the minimum sphere $SPH_{min}$ and the cylinder axis $\gamma_{AX}$. Alternatively, the triplet may be constituted by the mean sphere $SPH_{mean}$, the cylinder CYL and the cylinder axis $\gamma_{AX}$.

Whenever a lens is characterized by reference to one of its aspherical surfaces, a referential is defined with respect to micro-markings as illustrated in FIGS. 6 and 7, for a surface bearing micro-markings and for a surface not bearing the micro-markings respectively.

Figure 45:
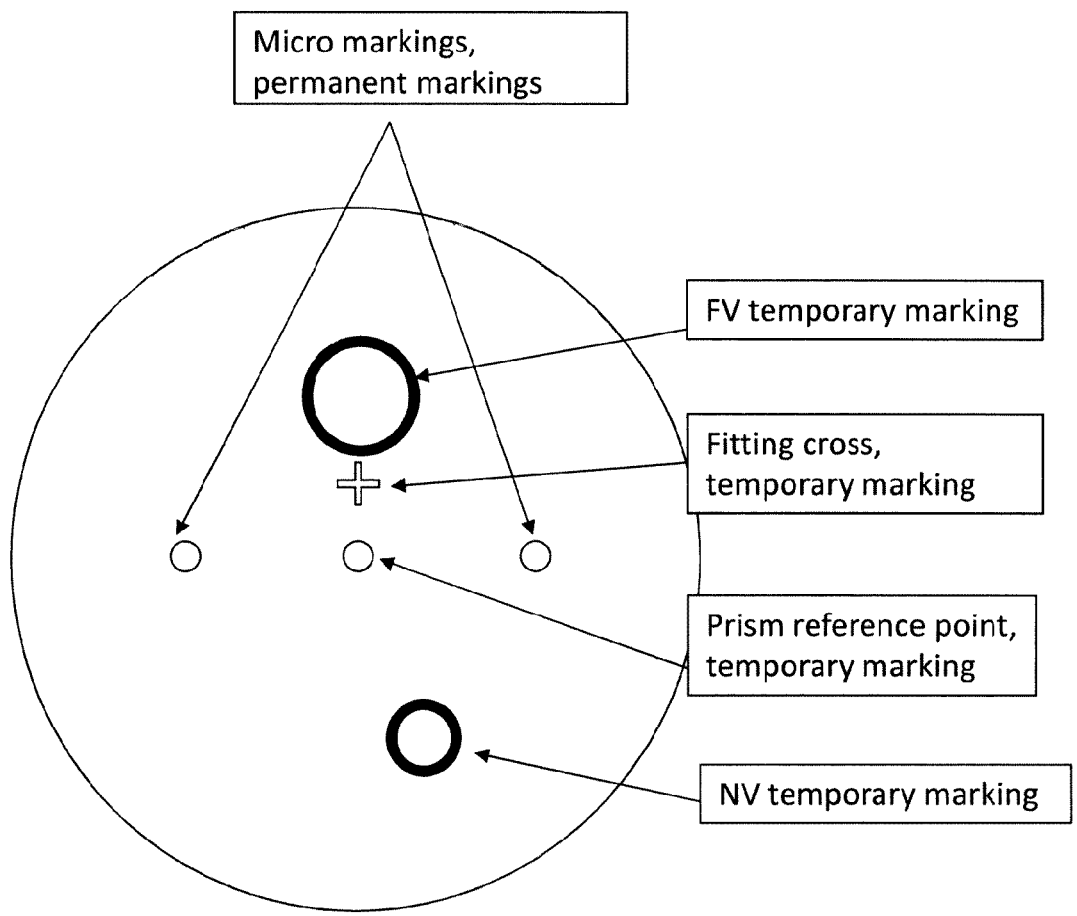
FIG. 45 shows a lens bearing the temporary markings applied by the lens manufacturer.

Progressive lenses comprise micro-markings that have been made mandatory by a harmonized standard ISO 8990-2. Temporary markings may also be applied on the surface of the lens, indicating diopter measurement positions (sometimes referred to as control points) on the lens, such as for far vision and for near vision, a prism reference point and a fitting cross for instance, as represented schematically in FIG. 45. It should be understood that what is referred to herein by the terms far vision diopter measurement position ("FV position") and near vision diopter measurement position ("NV position") can be any one of the points included in the orthogonal projection on the first surface of the lens, of respectively the FV and NV temporary markings provided by the lens manufacturer. If the temporary markings are absent or have been erased, it is always possible for a skilled person to position such control points on the lens by using a mounting chart and the permanent micro-markings.

The micro-markings also make it possible to define referentials for both surfaces of the lens.

FIG. 6 shows the referential for the surface bearing the micro-markings. The center of the surface (x=0, y=0) is the point of the surface at which the normal N to the surface intersects the center of the segment linking the two micro-markings. MG is the collinear unitary vector defined by the two micro-markings. Vector Z of the referential is equal to the unitary normal (Z=N); vector Y of the referential is equal to the vector product of Z by MG; vector X of the referential is equal to the vector product of Y by Z. {X, Y, Z} thereby form a direct orthonormal trihedral. The center of the referential is the center of the surface x=0 mm, y=0 mm. The X axis is the horizontal axis and the Y axis is the vertical axis as it shown in FIG. 3.

FIG. 7 shows the referential for the surface opposite to the surface bearing the micro-markings. The center of this second surface (x=0, y=0) is the point at which the normal N intersecting the center of the segment linking the two micro-markings on the first surface intersects the second surface. Referential of the second surface is constructed the same way as the referential of the first surface, i.e., vector Z is equal to the unitary normal of the second surface; vector Y is equal to the vector product of Z by MG; vector X is equal to the vector product of Y by Z. As for the first surface, the X axis is the horizontal axis and the Y axis is the vertical axis as it shown in FIG. 3. The center of the referential of the surface is also x=0 mm, y=0 mm.

Similarly, on a semi-finished lens blank, standard ISO 10322-2 requires micro-markings to be applied. The center of the aspherical surface of a semi-finished lens blank can therefore be determined as well as a referential as described above.

Moreover, a progressive multifocal lens may also be defined by optical characteristics, taking into consideration the situation of the person wearing the lenses.

Figure 9:
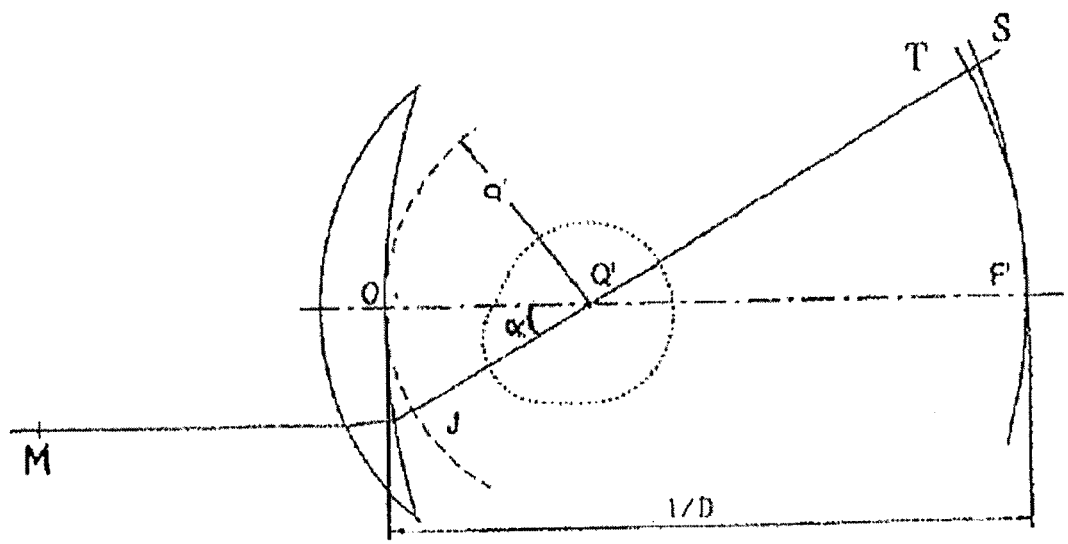

FIGS. 8 and 9 are diagrammatic illustrations of optical systems of eye and lens, thus showing the definitions used in the description. More precisely, FIG. 8 represents a perspective view of such a system illustrating parameters α and β used to define a gaze direction. FIG. 9 is a view in the vertical plane parallel to the antero-posterior axis of the wearer's head and passing through the center of rotation of the eye in the case when the parameter β is equal to 0.

The center of rotation of the eye is labeled Q'. The axis Q'F', shown on FIG. 9 in a dot-dash line, is the horizontal axis passing through the center of rotation of the eye and extending in front of the wearer—that is the axis Q'F' corresponding to the primary gaze view. This axis cuts the aspherical surface of the lens on a point called the fitting cross, which is present on lenses to enable the positioning of lenses in a frame by an optician. The point of intersection of the rear surface of the lens and the axis Q'F' is the point O. O can be the fitting cross if it is located on the rear surface. An apex sphere, of center Q', and of radius q', is tangential to the rear surface of the lens in a point of the horizontal axis. As examples, a value of radius q' of 25.5 mm corresponds to a usual value and provides satisfying results when wearing the lenses.

A given gaze direction, represented by a solid line on FIG. 8, corresponds to a position of the eye in rotation around Q' and to a point J of the apex sphere; the angle β is the angle formed between the axis Q'F' and the projection of the straight line Q'J on the horizontal plane comprising the axis Q'F'; this angle appears on the scheme on FIG. 8. The angle α is the angle formed between the axis Q'J and the projection of the straight line Q'J on the horizontal plane comprising the axis Q'F'; this angle appears on the scheme on FIGS. 8 and 9. A given gaze view thus corresponds to a point J of the apex sphere or to a couple (α, β). The more the value of the lowering gaze angle is positive, the more the gaze is lowering and the more the value is negative, the more the gaze is rising.

In a given gaze direction, the image of a point M in the object space, located at a given object distance, is formed between two points S and T corresponding to minimum and maximum distances JS and JT, which would be the sagittal and tangential local focal lengths. The image of a point in the object space at infinity is formed, at the point F'. The distance D corresponds to the rear frontal plane of the lens.

Ergorama is a function associating to each gaze direction the usual distance of an object point. Typically, in far vision following the primary gaze direction, the object point is at infinity. In near vision, following a gaze direction essentially corresponding to an angle α of the order of 35° and to an angle β of the order of 5° in absolute value toward the nasal side, the object distance is of the order of 30 to 50 cm. For more details concerning a possible definition of an ergorama, U.S. Pat. No. 6,318,859 may be considered. This document describes an ergorama, its definition and its modeling method. For a method of the invention, points may be at infinity or not. Ergorama may be a function of the wearer's ametropia.

Using these elements, it is possible to define a wearer optical power and astigmatism, in each gaze direction. An object point M at an object distance given by the ergorama is considered for a gaze direction (α,β). An object proximity ProxO is defined for the point M on the corresponding light ray in the object space as the inverse of the distance MJ between point M and point J of the apex sphere in accordance with (15):

$$ProxO = 1/MJ \qquad (15).$$

This enables calculation of the object proximity within a thin lens approximation for all points of the apex sphere, which is used for the determination of the ergorama. For a real lens, the object proximity can be considered as the inverse of the distance between the object point and the front surface of the lens, on the corresponding light ray.

For the same gaze direction (α,β), the image of a point M having a given object proximity is formed between two points S and T which correspond respectively to minimal and maximal focal distances (which would be sagittal and tangential focal distances). The quantity ProxI is called image proximity of the point M in accordance with (16):

$$ProxI = \frac{1}{2}\left(\frac{1}{JT} + \frac{1}{JS}\right). \qquad (16)$$

By analogy with the case of a thin lens, it can therefore be defined, for a given gaze direction and for a given object proximity, i.e. for a point of the object space on the corresponding light ray, an optical power Pui as the sum of the image proximity and the object proximity in accordance with (17).

$$Pui = ProxO + ProxI \qquad (17).$$

With the same notations, an astigmatism Ast is defined for every gaze direction and for a given object proximity as in accordance with (18):

$$Ast = \left|\frac{1}{JT} - \frac{1}{JS}\right|. \qquad (18)$$

This definition corresponds to the astigmatism of a ray beam created by the lens. It can be noticed that the definition gives, in the primary gaze direction, the classical value of astigmatism. The astigmatism angle, usually called axis, is the angle γ. The angle γ is measured in the frame $\{Q', x_m, y_m, z_m\}$ linked to the eye. It corresponds to the angle with which the image S or T is formed depending on the convention used with relation to the direction $z_m$ in the plane $\{Q', z_m, y_m\}$.

Possible definitions of the optical power and the astigmatism of the lens, in the wearing conditions, can thus be calculated as explained in the article by B. Bourdoncle et al., entitled "Ray tracing through progressive ophthalmic lenses", 1990 International Lens Design Conference, D. T. Moore ed., Proc. Soc. Photo. Opt. Instrum. Eng. Standard wearing conditions are to be understood as the position of the lens with relation to the eye of a standard wearer, notably defined by a pantoscopic angle of −8°, a lens-pupil distance of 12 mm, a pupil-eye rotation center of 13.5 mm and a wrap angle of 0°. The pantoscopic angle is the angle in the vertical plane between the optical axis of the spectacle lens and the visual axis of the eye in the primary position, usually taken to be the horizontal. The wrap angle is the angle in the horizontal plane between the optical axis of the spectacle lens and the visual axis of the eye in the primary position, usually taken to be the horizontal. Other conditions may be used. Wearing conditions may be calculated from a raytracing program, for a given lens. Further, the optical power and the astigmatism may be calculated so that the prescription is either fulfilled at the reference points (i.e., control points in far vision) and for a wearer wearing spectacles in the wearing conditions or measured by a frontofocometer.

Figure 10:
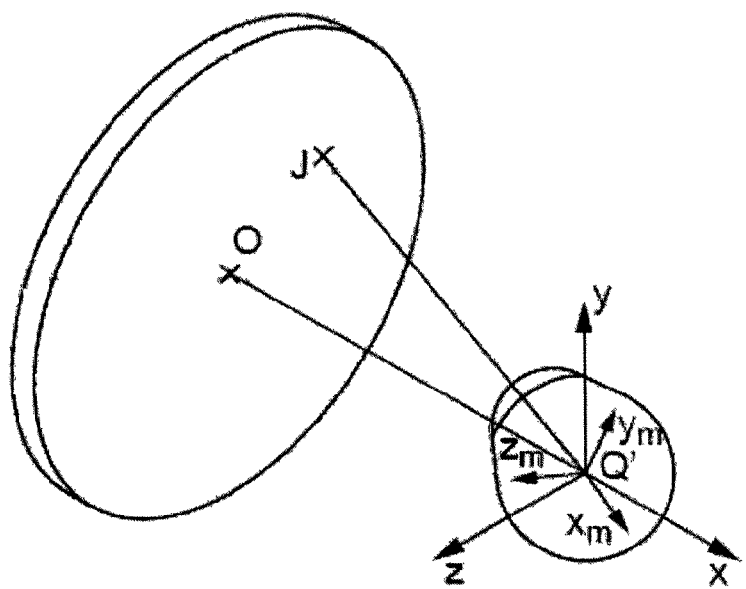
FIG. 10 shows a ray tracing from the center of rotation of the eye.

FIG. 10 represents a perspective view of a configuration wherein the parameters α and β are non zero. The effect of rotation of the eye can thus be illustrated by showing a fixed frame $\{x, y, z\}$ and a frame $\{x_m, y_m, z_m\}$ linked to the eye. Frame $\{x, y, z\}$ has its origin at the point Q'. The axis x is the axis Q'O and it is oriented from the lens toward the eye. The y axis is vertical and oriented upwardly. The z axis is such that the frame $\{x, y, z\}$ be orthonormal and direct. The frame $\{x_m, y_m, z_m\}$ is linked to the eye and its center is the point Q'. The $x_m$ axis corresponds to the gaze direction JQ'. Thus, for a primary gaze direction, the two frames $\{x, y, z\}$ and $\{x_m, y_m, z_m\}$ are the same. It is known that the properties for a lens may be expressed in several different ways and notably in surface and optically. A surface characterization is thus equivalent to an optical characterization. In the case of a blank, only a surface characterization may be used. It has to be understood that an optical characterization requires that the lens has been machined to the wearer's prescription. In contrast, in the case of an ophthalmic lens, the characterization may be of a surface or optical kind, both characterizations enabling to describe the same object from two different points of view. Whenever the characterization of the lens is of optical kind, it refers to the ergorama-eye-lens system described above. For simplicity, the term 'lens' is used in the description but it has to be understood as the 'ergorama-eye-lens system'. The value in surface terms can be expressed with relation to points. The points are located with the help of abscissa or ordinate in a frame as defined above with respect to FIGS. 3, 6 and 7.

The values in optic terms can be expressed for gaze directions. Gaze directions are usually given by their degree of lowering and azimuth in a frame whose origin is the center of rotation of the eye. When the lens is mounted in front of the eye, a point called the fitting cross is placed before the pupil or before the eye rotation center Q' of the eye for a primary gaze direction. The primary gaze direction corresponds to the situation where a wearer is looking straight ahead. In the chosen frame, the fitting cross corresponds thus to a lowering angle α of 0° and an azimuth angle β of 0° whatever surface of the lens the fitting cross is positioned—rear surface or front surface.

The above description made with reference to FIGS. 8-10 was given for central vision. In peripheral vision, as the gaze direction is fixed, the center of the pupil is considered instead of center of rotation of the eye and peripheral ray directions are considered instead of gaze directions. When peripheral vision is considered, angle α and angle β correspond to ray directions instead of gaze directions.

In the remainder of the description, terms like up, bottom, horizontal, <<vertical>>, <<above>>, <<below>>, or other words indicating relative position may be used. These terms are to be understood in the wearing conditions of the lens. Notably, the "upper" part of the lens corresponds to a negative lowering angle α<0° and the "lower" part of the lens corresponds to a positive lowering angle α>0°. Similarly, the "upper" part of the surface of a lens—or of a semi-finished lens blank—corresponds to a positive value along the y axis, and preferably to a value along the y axis superior to the y_value at the fitting cross and the "lower" part of the surface of a lens or of a semi-finished lens blank—corresponds to a negative value along the y axis in the frame as defined above with respect to FIGS. 3, 6 and 7, and preferably to a value along the y axis inferior to the y_value at the fitting cross.

Figure 14:
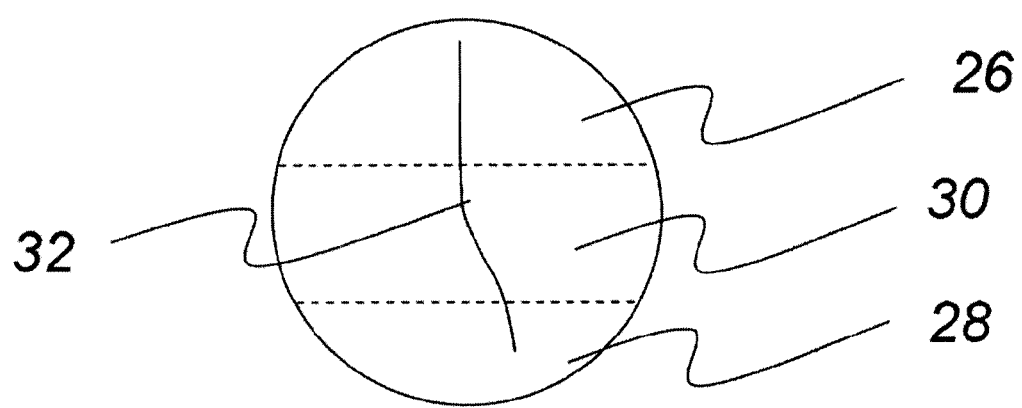
FIGS. 14 and 15 show field vision zones of a lens.
Figure 15:
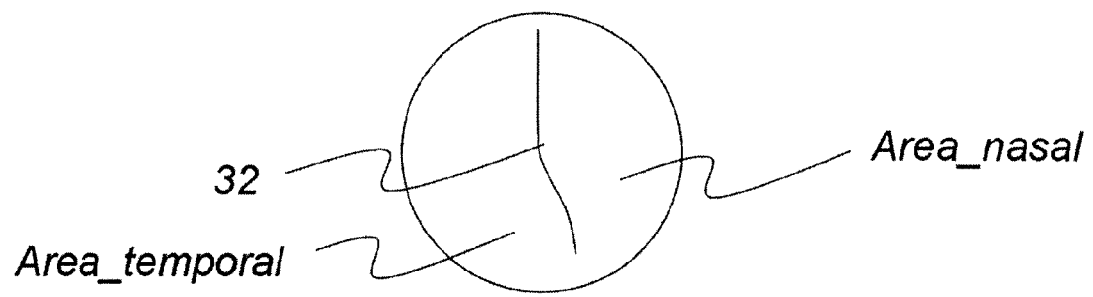

The visual field zones seen through a lens are schematically illustrated in FIGS. 14 and 15. The lens comprises a far vision zone 26 located in the upper part of the lens, a near vision zone 28 located in the lower part of the lens and an intermediate zone 30 situated in the lower part of the lens between the far vision zone 26 and the near vision zone 28. The lens also has a main meridian 32 passing through the three zones and defining a nasal side and a temporal side.

For the purpose of the invention, the meridian line 32 of a progressive lens is defined as follow: for each lowering of the view of an angle $\alpha=\alpha_1$ between the gaze direction corresponding to the fitting cross and a gaze direction being in the near vision zone, the gaze direction $(\alpha_1, \beta_1)$ is searched for which the local residual astigmatism is minimum. Thus, all the gaze directions defined in that way form the meridian line of the ergorama-eye-lens system. The meridian line of the lens represents the locus of mean gaze directions of a wearer when he is looking from far to near visions. The meridian line 32 of a surface of the lens is defined as follows: each gaze direction (α, β) belonging to the optical meridian line of the lens intersects the surface at a point (x, y). The meridian line of the surface is the set of points corresponding to the gaze directions of the meridian line of the lens.

As shown in FIG. 15, the meridian 32 separates the lens into a nasal area and a temporal area. As expected, the nasal area is the area of the lens which is between the meridian and the nose of the wearer whereas the temporal area is the area which is between the meridian and the temple of the wearer. The nasal area is labeled Area_nasal and the temporal area is labeled Area_temporal, as it will in the remainder of the description.

The invention relies on a study by the applicant of the distortion. Distortion is a defect which is not related to the resolution of images impacting the sharpness or the contrast of the image formed by the periphery of the visual field of the lens but merely to their shape. In ophthalmic optics, "barrel" distortion occurs with minus lenses whereas "pincushion" distortion occurs with plus lenses; these are inherent in the optical characteristics of simple plus or minus lenses. Distortion can be evaluated in different situations of use of the lens.

Figure 11:
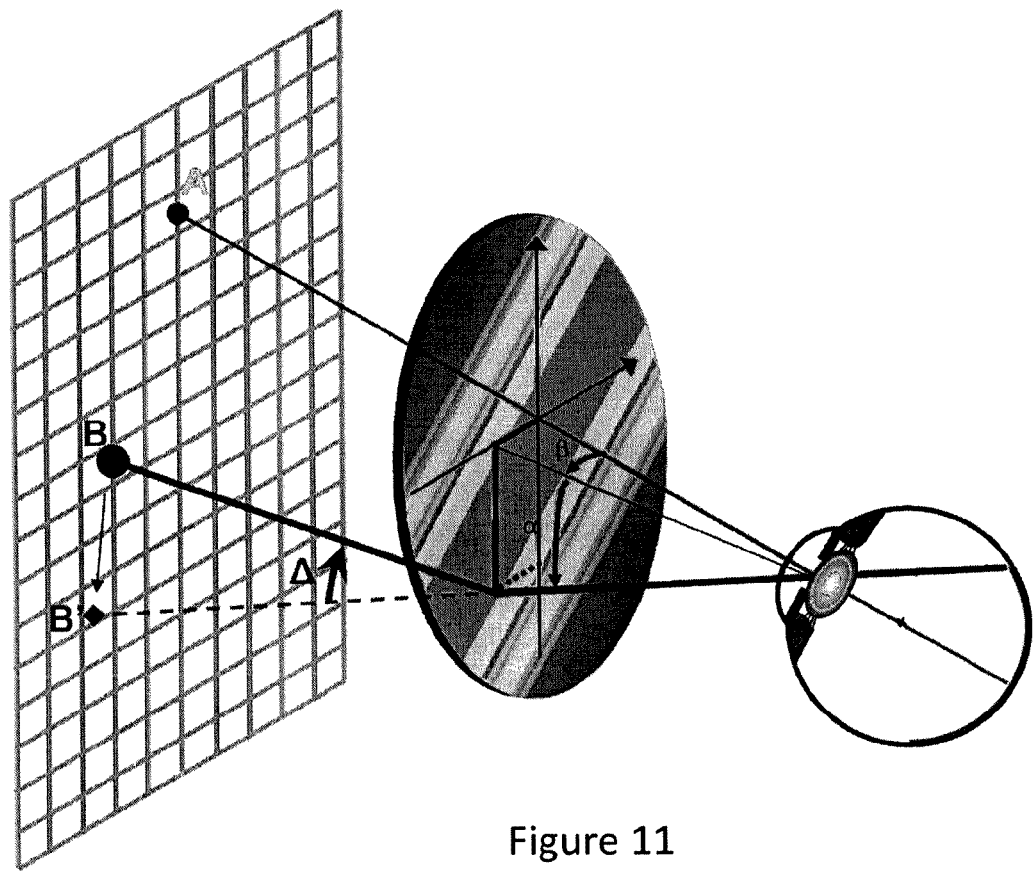
FIGS. 11, 12 and 13 show the effect of distortion in static vision and ways to quantify this phenomenon.
Figure 12:
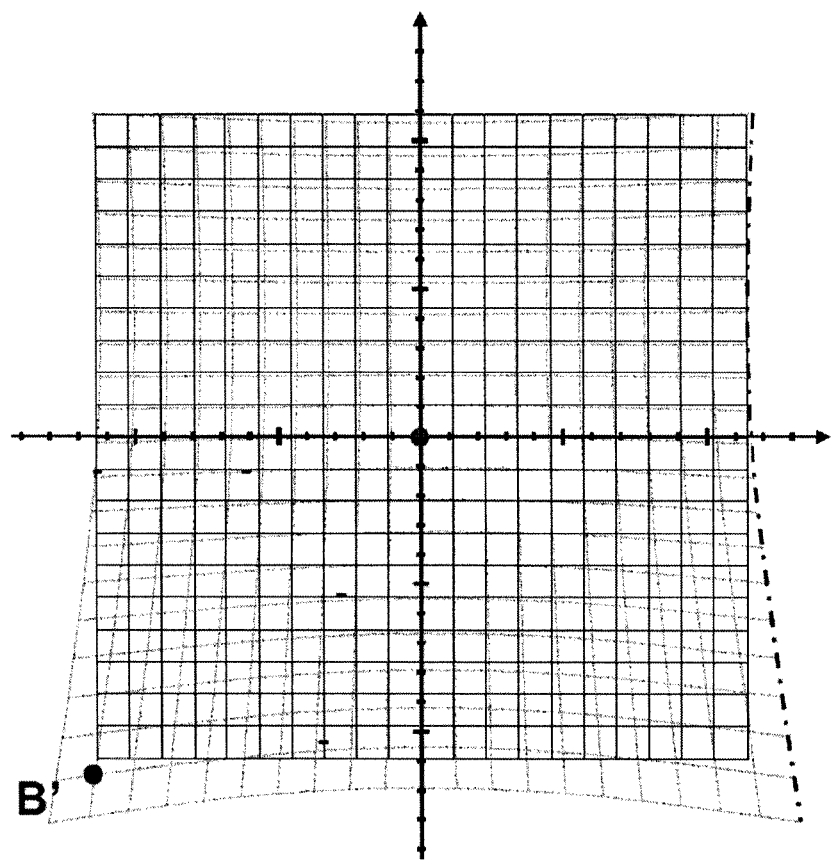
Figure 13:
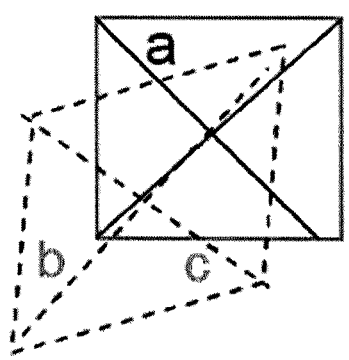

First, a fixation point is imposed to the wearer so that he keeps his eye immobile (thus the gaze direction is fixed). In this case, the distortion which is evaluated is called static distortion and it is evaluated in peripheral vision (named also indirect vision). FIG. 11 illustrates the effect of distortion along a ray seen by a viewer in his peripheral field of vision after passing through a lens. Thus, while the wearer is looking at a point A in central vision, some peripheral points such as point B are also seen. Due to prismatic deviation, the wearer has the feeling that the object point is at B' and not at point B. The angle A is a quantitative way of expressing the prismatic deviation which gives to the wearer the illusion that point B is located at point B'. Several quantities can be calculated to evaluate distortion. For instance, we can quantify how a vertical and/or a horizontal line of an object grid seen in the peripheral vision as being curved, as shown in FIG. 12. In this figure, the grid (solid lines) seen without the lens and which is not deformed is superimposed with the distorted grid (broken lines) seen through the lens. Therefore, it becomes apparent that the distortion has an impact on peripheral vision. Moreover, it also appears that the distortion can be quantified by calculating how a peripheral square is deformed. For this calculation, FIG. 13 is an enlarged view of one square of the grid seen without the lens over which is superimposed the deformed square of the deformed grid seen through the lens. The square has two diagonals whose lengths are labeled a. Thus, the division of the length of each diagonal is a/a=1 in the case of the square of the grid seen without the lens. The corresponding deformed square has two diagonals with lengths that are different and are respectively labeled b and c, b corresponding to a diagonal longer than c. For this deformed square b/c is different from 1. The more this ratio is greater than 1, the greater is the distortion in this area of the lens. Calculating the ratio of the diagonal is thus a way of quantifying distortion.

Distortion can also be evaluated considering that the eye is moving behind the lens and this kind of distortion is named dynamic distortion. It appears in the periphery of the central visual field and it is evaluated in central vision (named also direct vision).

Thus distortion can be evaluated in static vision, i.e., the direction of gaze is fixed and distortion is analyzed in peripheral vision. Distortion can also be evaluated in dynamic vision, i.e., the direction of gaze is free and distortion is analyzed in central vision. Evaluation in static or dynamic vision is made depending on the intended use of the lens. Reference can be made publication entitled, "La distortion en optique de lunetterie," Yves LE GRAND, Annales d'Optique Oculaire 5ème armée N° 1 Janvier 1956.

FIG. 11 illustrates distortion in static vision. In dynamic vision, the quantities analyzed would be different—magnification in peripheral or central vision respectively—but the conclusions remain the same, i.e. magnification variations must be mastered.

So as to reduce distortion, the phenomena which trigger distortion should be pointed out. Concerning progressive multifocal lenses, two phenomena are involved. First, in the periphery of the field of view, the optical mean power in central vision (and consequently the optical mean power in peripheral vision) increases when lowering the gaze direction (or for when lowering the peripheral ray direction) from the upper part of the lens to the lower part of the lens. This effect is due to the fact that to suit the presbyopic wearer needs, the optical power between the far and near visions of the multifocal lens is increasing. In the following, the phrase 'upper/lower parts of the lens' means the upper/lower parts of the central or peripheral field of view depending on whether static vision or dynamic vision is considered. This implies that the mean central or peripheral magnifications of the eye-lens system also increases when lowering the gaze or peripheral ray direction from the central or peripheral far vision zone to the central or peripheral near vision zone since mean magnification is, at least at first order, proportional to mean power. A way of reducing distortion is thus to minimize the difference in mean central or peripheral magnification between the far vision zone and the near vision zone.

Figure 16:
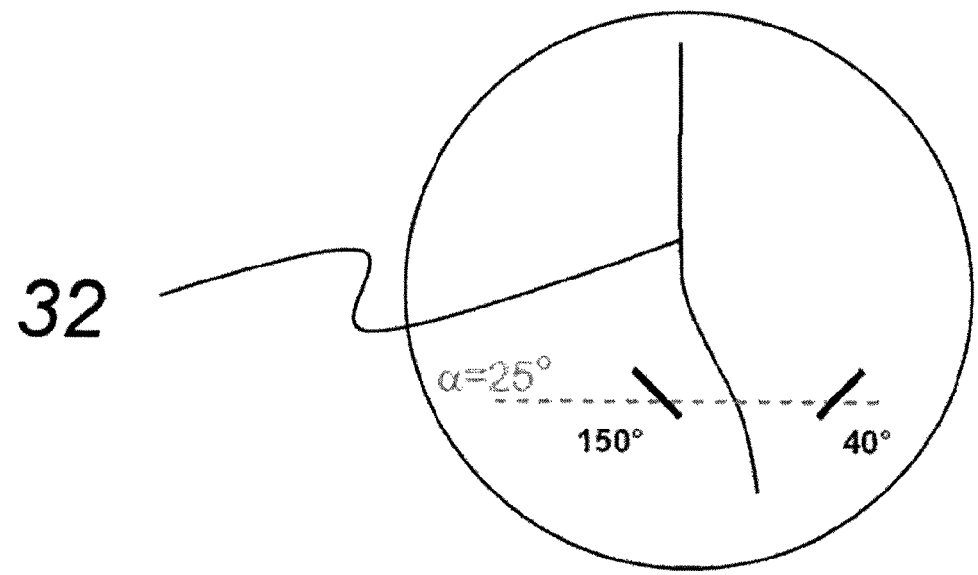
FIGS. 16 and 17 show the phenomena responsible for the distortion.
Figure 17:
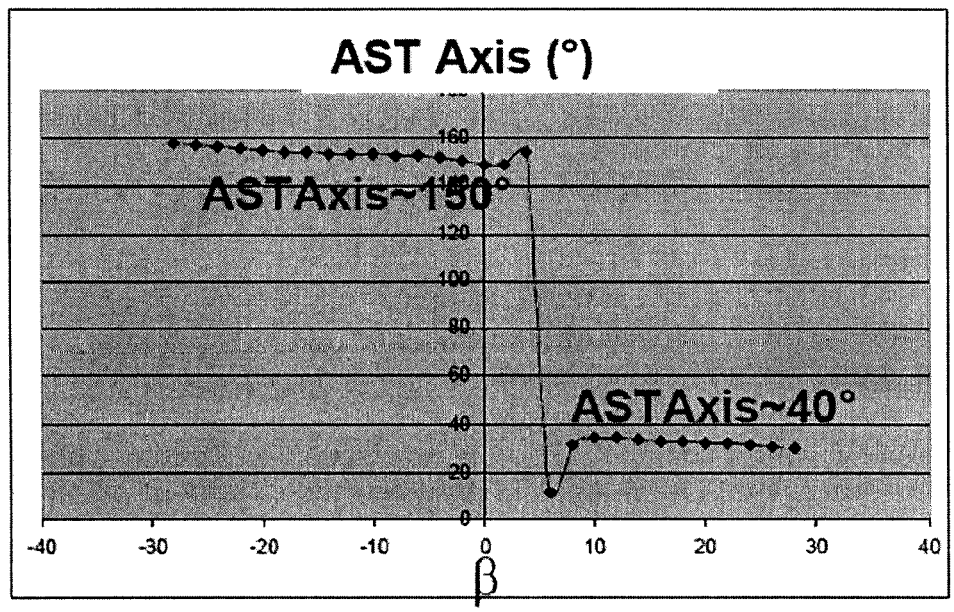

Second, the power progression also generates residual astigmatism on both sides of the meridian line. This observation can be shown by considering FIGS. 16 and 17 which represent a part of the characteristics of a lens suitable for a wearer whose prescription is a spherical prescription (no astigmatism in the prescription). FIG. 16 is a schematic view of the mean orientation of the astigmatism axis of the lens, the mean value being calculated in the lower part of the lens for a lowering gaze direction equal to 25°. FIG. 17 corresponds to the variation of the axis of the resulting astigmatism evaluated in central vision as a function of azimuth angle $\beta$ for a given fixed lowering angle $\alpha_1$ as it is shown in FIG. 16. It can be observed that on each side of the meridian 32, for a given fixed angle $\alpha_1$, the residual astigmatism axes are nearly constant for all given gaze direction ($\alpha_1,\beta$). For example, for the selected lens, and for $\alpha_1$, on the temporal side, the axis of resulting astigmatism is about 150° and on the nasal side, it is about 40°. These indications are depicted schematically on FIG. 16. Residual astigmatism can be evaluated, such as mean power, in peripheral vision or in central vision. Residual astigmatism is the astigmatism defect that means the astigmatism that is not required to correct the wearer's vision.

Astigmatism has an impact on distortion. Indeed, for each gaze direction, the astigmatism value is the difference between the minimal optical power (optical power along the axis of astigmatism) and the maximal optical power (optical power along the counter axis of astigmatism, the counter axis being defined as equal to the axis of astigmatism+90°), thereby resulting in difference in magnification between the two axes (the axis and the counter axis). Another way of reducing distortion is thus to minimize the difference in central or peripheral magnification between these two axes for each gaze direction, Minimizing the difference in magnification between these two axes for each gaze direction while maintaining optical criteria, for example of power and astigmatism, thus enables improvement of the performance of the lens relative to distortion while guaranteeing good sharpness of the image for the wearer.

Figure 18:
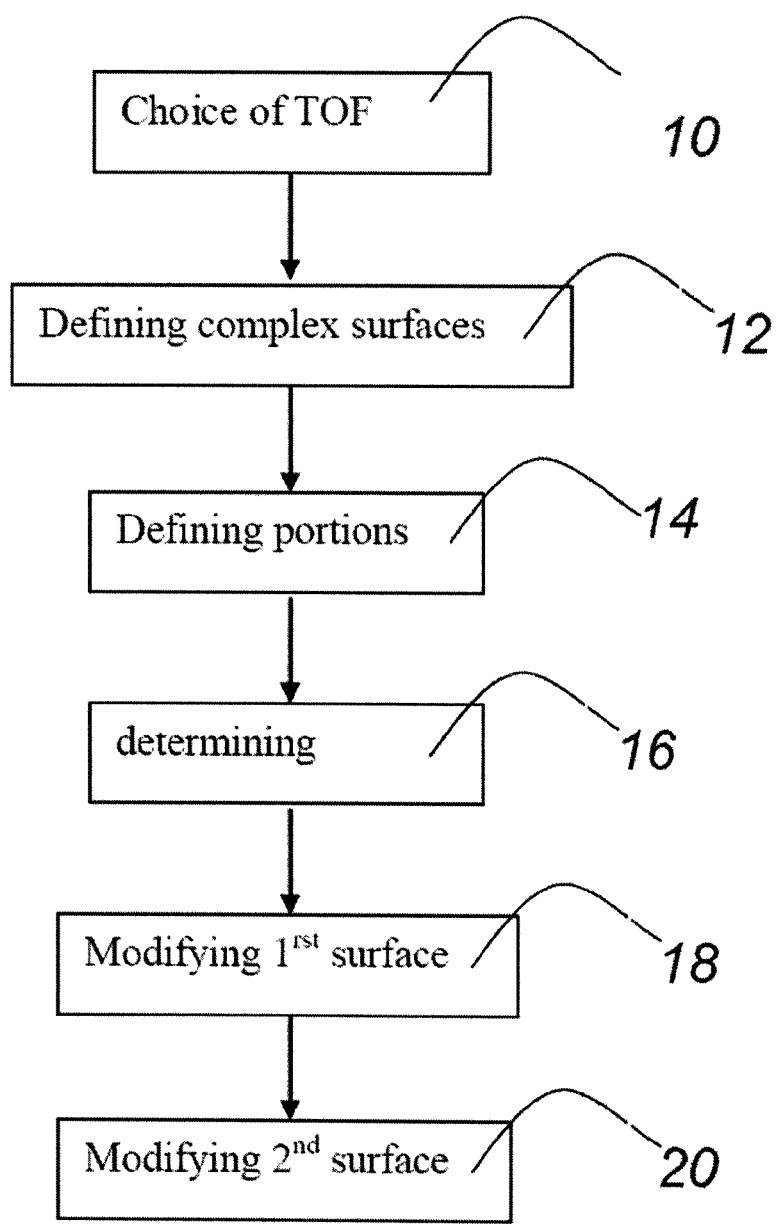
FIG. 18 is a schematic flowchart of the steps of the method for determining a progressive lens according to the invention.

FIG. 18 illustrates a flowchart of an example of the method according to the invention for determining a progressive ophthalmic lens. In this embodiment, the method comprises the step 10 of choosing a target optical function ("TOF") suited to the wearer. As known, to improve the optical performances of an ophthalmic lens, methods for optimizing the parameters of the ophthalmic lens are thus used. Such optimization methods are designed so as to get the optical function of the ophthalmic lens as close as possible to a predetermined target optical function.

The target optical function represents the optical characteristics the ophthalmic lens should have. In the context of the present invention and in the remainder of the description, the phrase "target optical function of the lens" is used for convenience. This use is not strictly correct in so far as a target optical function has only a sense for a wearer ophthalmic lens and ergorama system. Indeed, the optical target function of such system is a set of optical criteria defined for given gaze directions. This means that an evaluation of an optical criterion for one gaze direction gives an optical criterion value. The set of optical criteria values obtained is the target optical function. The target optical function then represents the performance to be reached. In the simplest case, there will only be one optical criterion such as optical power or astigmatism; however, more elaborate criteria may be used such as mean power which is a linear combination of optical power and astigmatism. Optical criteria involving aberrations of higher order may be considered. The number of criteria N considered depends on the precision desired. Indeed, the more criteria considered, the more the lens obtained is likely to satisfy the wearer's needs. However, increasing the number N of criteria may result in increasing the time taken for calculation and the complexity to the optimization problem to be solved. The choice of the number N of criteria considered will then be a trade-off between these two requirements. More details about target optical functions, optical criteria definition and optical criteria evaluation can be found in EP 2207118.

The method also comprises a step 12 of defining a first aspherical surface of the lens and a second aspherical surface of the lens. For instance, the first surface is an object side (or front) surface and the second surface is an eyeball side (or back) surface. Each surface has in each point a mean sphere value $SPH_{mean}$, a cylinder value CYL and a cylinder axis $\gamma_{AX}$.

The method further encompasses a step 14 of defining at least one first portion Portion1 in the temporal area and/or at least one second portion Portion2 in the nasal area. Therefore, Portion1 is included in Area_temporal and Portion2 is included in Area_nasal.

Figure 19:
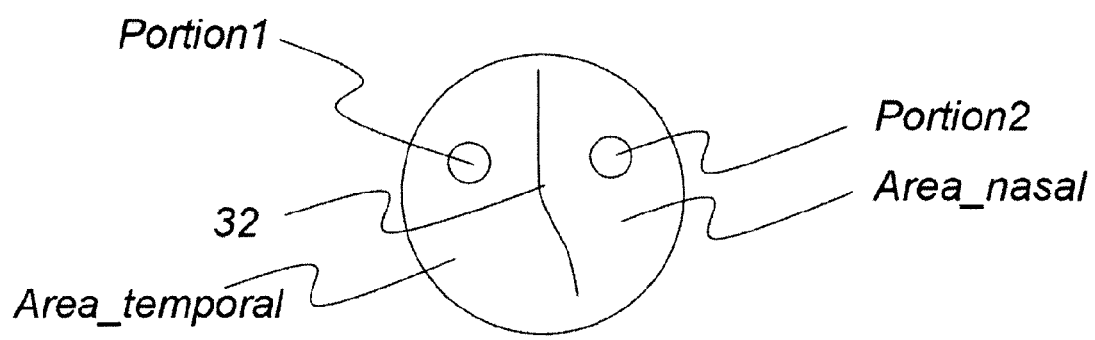
FIG. 19 shows elements of the lens.

Examples of choice of these portions Portion1 and Portion2 are illustrated in FIG. 19. In the example of FIG. 19, the portions are discs which are symmetrical with respect to the meridian 32 of the lens. Those optical zones Portion1 and Portion2 have corresponding portions on the front surface of the lens. Each gaze direction delimiting the optical portions intersects the first aspherical surface (the front surface) so as to define corresponding portions on the front surface Portion1_Front_Surface and Portion2_Front_Surface.

According to embodiments, Portion1 and Portion2 in the temporal area and in the nasal area may be defined on the lens as follows: When central vision is considered, Portion1 in the temporal area may be delimited by gaze directions of $0°<\alpha<30°$ and $-40°<\beta<-5°$ and such that resulting astigmatism in the portion considered is more than 0.50 diopters. Portion2 in the nasal area may be delimited by gaze directions of $0°<\alpha<30°$ and $5°<\beta<40°$ and such that resulting astigmatism in the portion considered is more than 0.50 diopters.

When central vision is considered, Portion1 in the temporal area may be further delimited by gaze directions of $5°<\alpha<30°$ and $-30°<\beta<-10°$ and such that resulting astigmatism in the portion considered is more than 0.50 diopters. Portion2 in the nasal area may be further delimited by gaze directions of $5°<\alpha<30°$ and $10°<\beta<30°$ and such that resulting astigmatism in the portion considered is more than 0.50 diopters.

When peripheral vision is considered, for a fixed gaze direction in primary gaze direction, Portion1 in the temporal area may be delimited by ray directions of $0°<\alpha<50°$ and $-50°<\beta<-10°$ and such that resulting astigmatism in the portion considered is more than 0.50 diopters. Portion2 in the nasal area may be delimited by ray directions of $0°<\alpha<50°$ and $10°<\beta<50°$ and such that resulting astigmatism in the portion considered is more than 0.50 diopters.

When peripheral vision is considered, Portion1 in the temporal area may be further delimited by ray directions of $10°<\alpha<50°$ and $-40°<\beta<-20°$ and such that resulting astigmatism in the portion considered is more than 0.50 diopters. Portion2 in the nasal area may be further delimited by ray directions of $10°<\alpha<50°$ and $20°<\beta<40°$ and such that resulting astigmatism in the portion considered is more than 0.50 diopters.

When peripheral vision is considered, for a fixed gaze direction in the intermediate or near visions, Portion1 in the temporal area may be delimited by ray directions of $-20°<\alpha<20°$ and $-50°<\beta<-10°$ and such that resulting astigmatism in the portion considered is more than 0.50 diopters. Portion2 in the nasal area may be delimited by ray directions of $-20°<\alpha<20°$ and $10°<\beta<50°$ and such that resulting astigmatism in the portion considered is more than 0.50 diopters.

When peripheral vision is considered, for a fixed gaze direction in the intermediate or near visions, Portion1 in the temporal area may be further delimited by ray directions of $-20°<\alpha<20$ and $-40°<\beta<-20°$ and such that resulting astigmatism in the portion considered is more than 0.50 diopters. Portion2 in the nasal area may be further delimited by ray directions of $-20°<\alpha<20$ and $20°<\beta<40°$ and such that resulting astigmatism in the portion considered is more than 0.50 diopters.

When the lens is mounted, Portion1 and Portion2 may be further reduced.

Figure 29A:
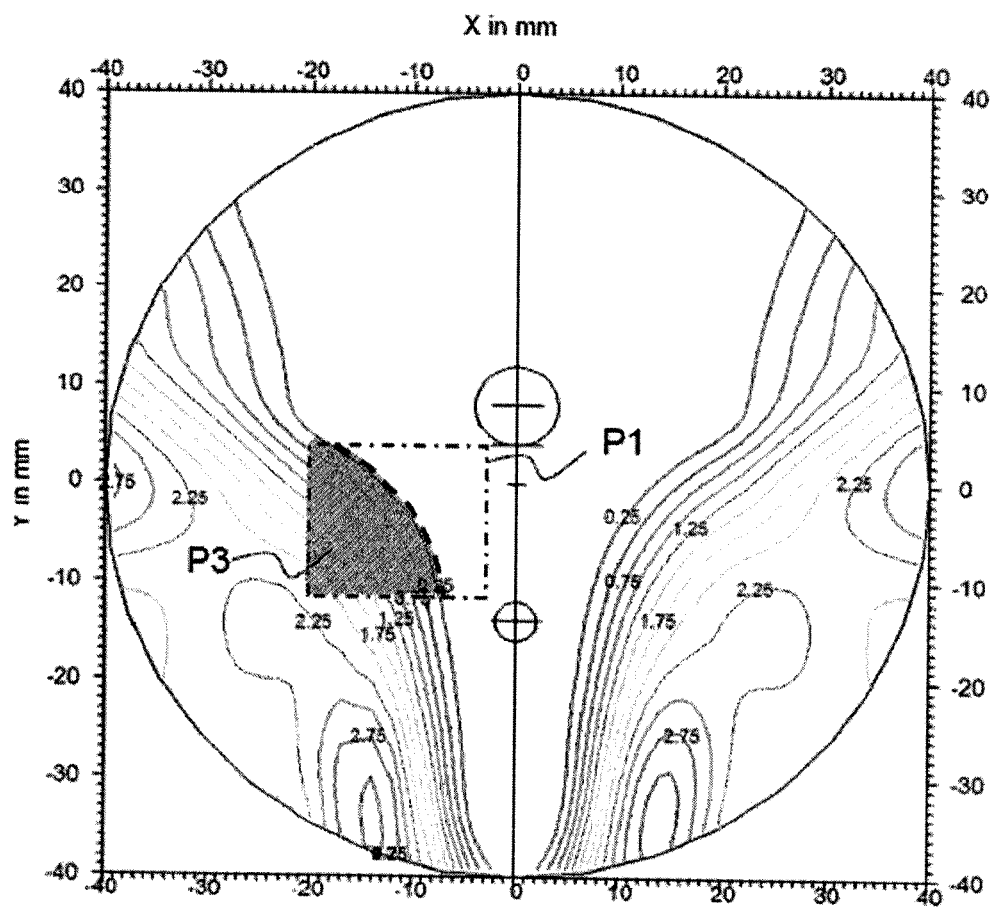
FIG. 29a shows a cylinder distribution map to illustrate a part of the method according to an embodiment of the invention and including a certain-sized area considered for an axis evaluation.
Figure 29B:
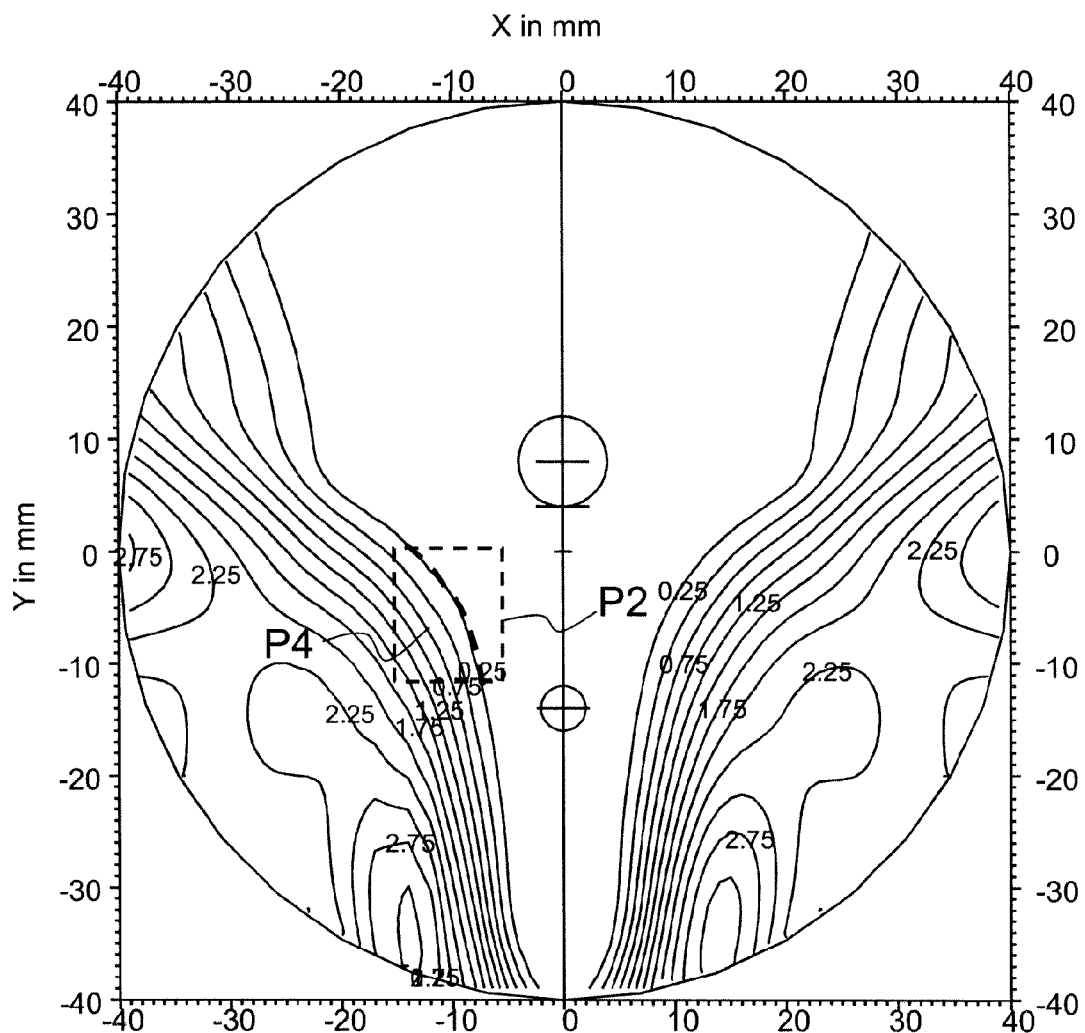
FIG. 29b shows a cylinder distribution map to illustrate a part of the method according to the embodiment of the invention shown in FIG. 29a, and including a differently-sized area considered for an axis evaluation.
Figure 30A:
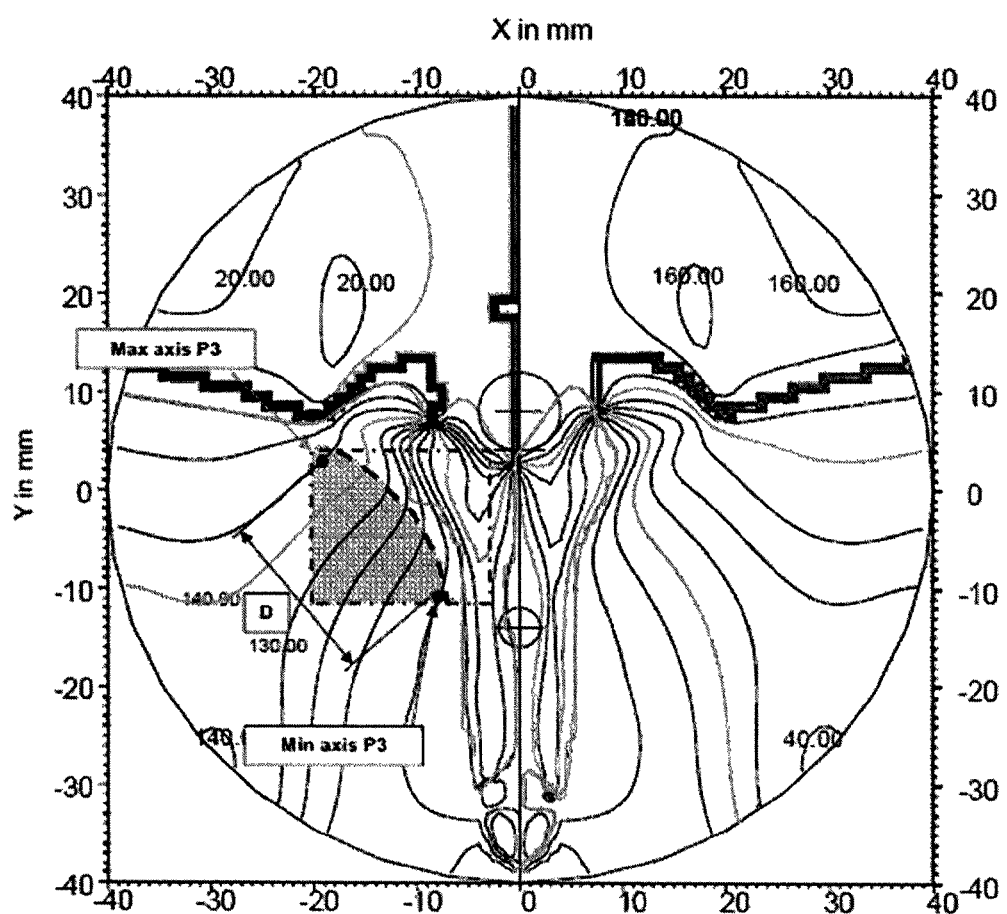
Figure 30B:
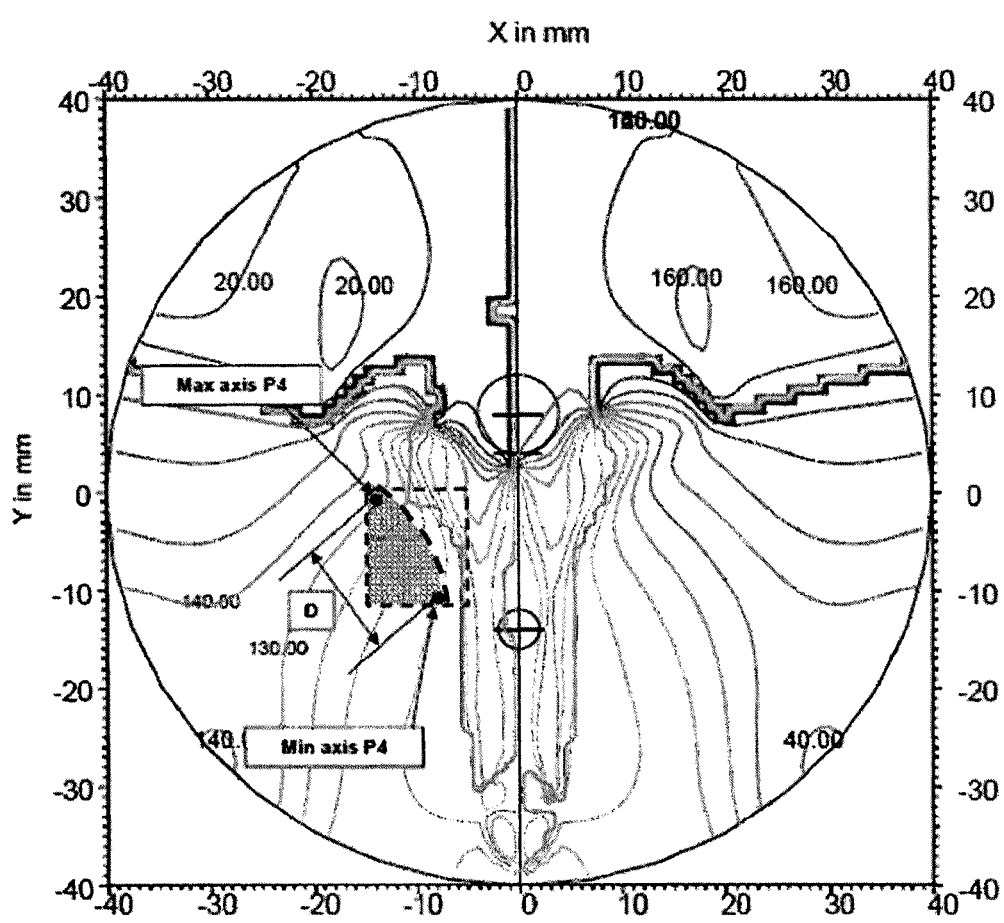
FIG. 30b shows a cylinder axis distribution map with the area considered for an axis evaluation shown in FIG. 29b.
Figure 33:
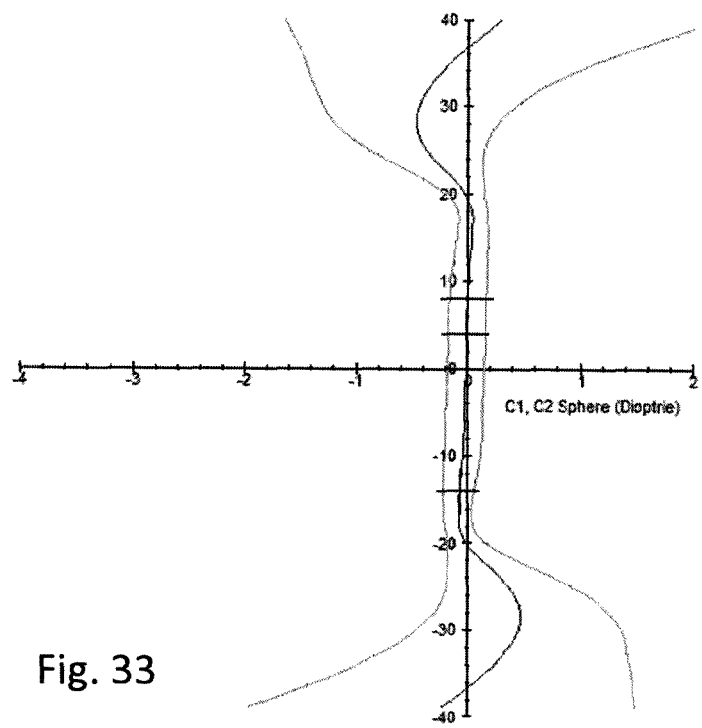
FIG. 33 shows a profile, for the first surface of a lens, of the deviation along the main meridian of the mean sphere value, minimum sphere value and maximum sphere value from the sphere value at reference point x=0, y=0 according to a first embodiment of the invention.
Figure 34:
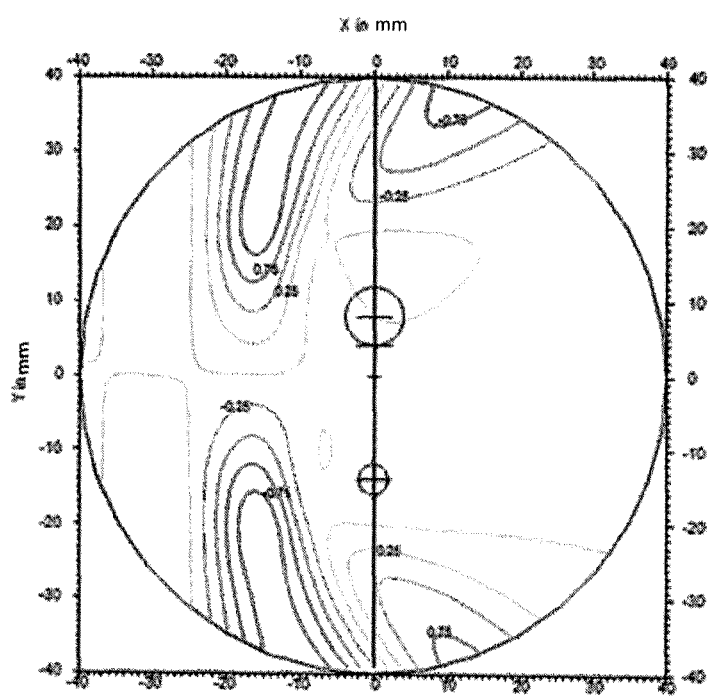
FIG. 34 shows a map for the entire first lens surface of the deviation of the mean sphere value from the sphere value at reference point x=0, y=0 according to the first embodiment of the invention.
Figure 35:
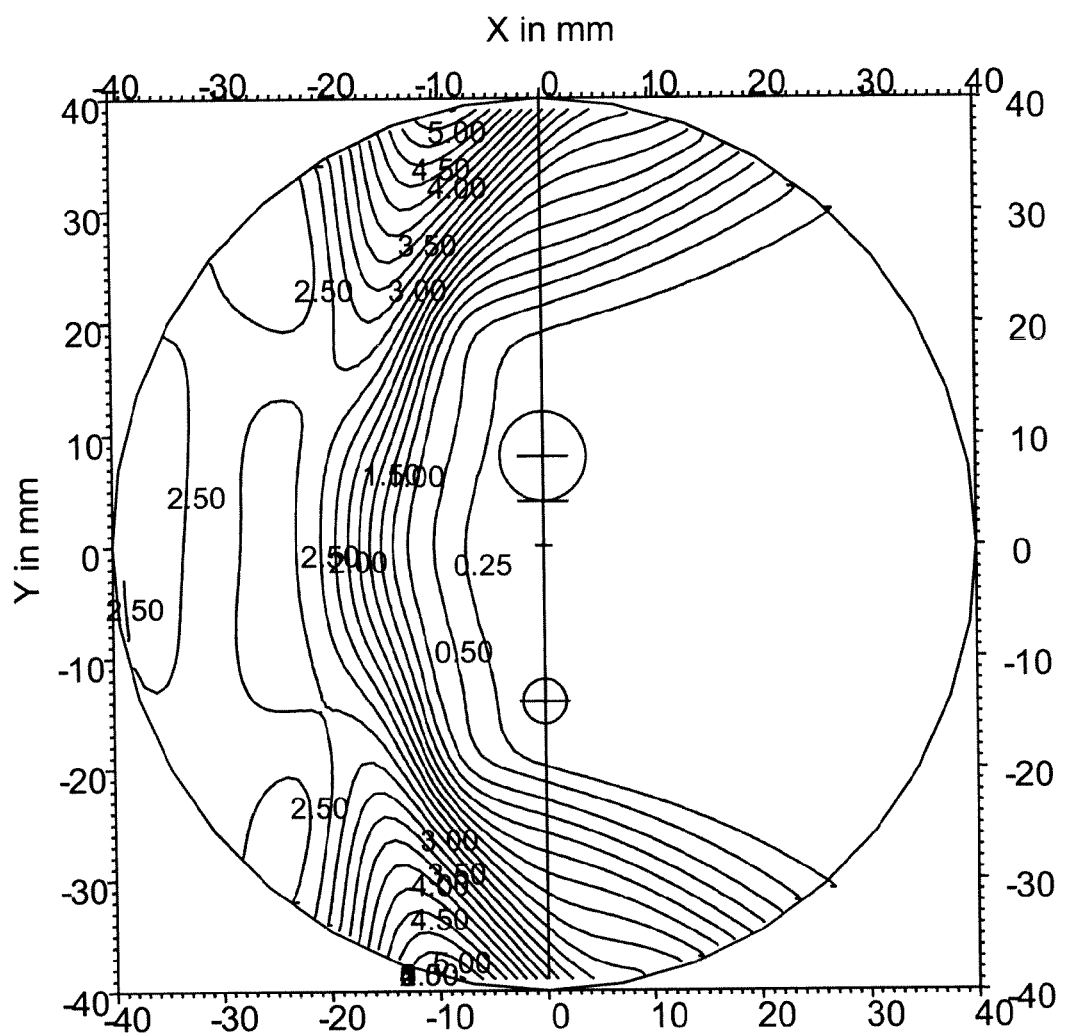
FIG. 35 shows a cylinder distribution map according to the first embodiment of the invention.
Figure 36:
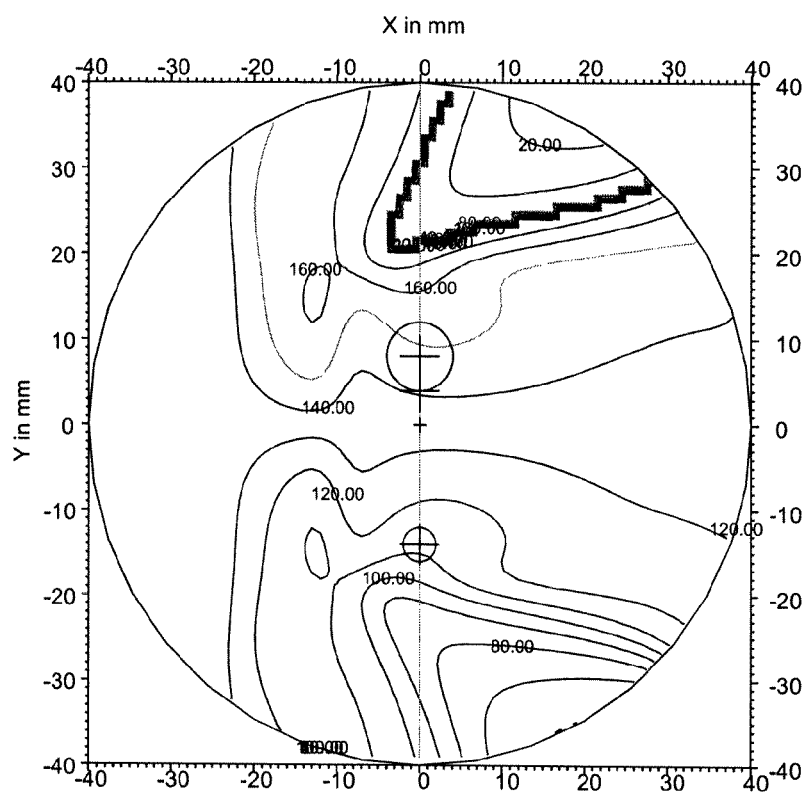
FIG. 36 shows a cylinder axis distribution map according to the first embodiment of the invention.
Figure 37:
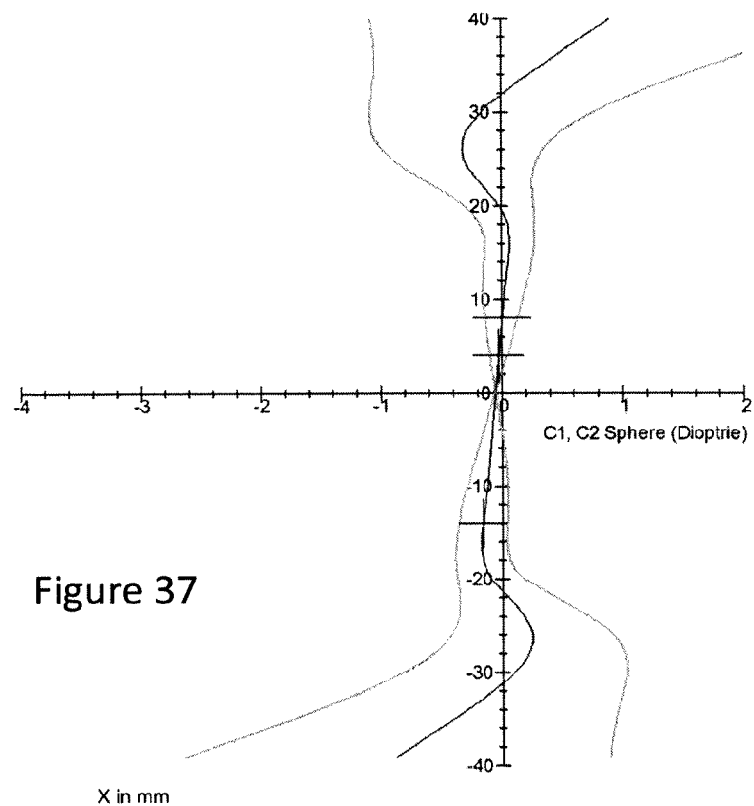
FIG. 37 shows a profile, for the first surface of a lens, of the deviation along the main meridian of the mean sphere value, minimum sphere value and maximum sphere value from the sphere value at reference point x=0, y=0 according to a second embodiment of the invention.
Figure 38:
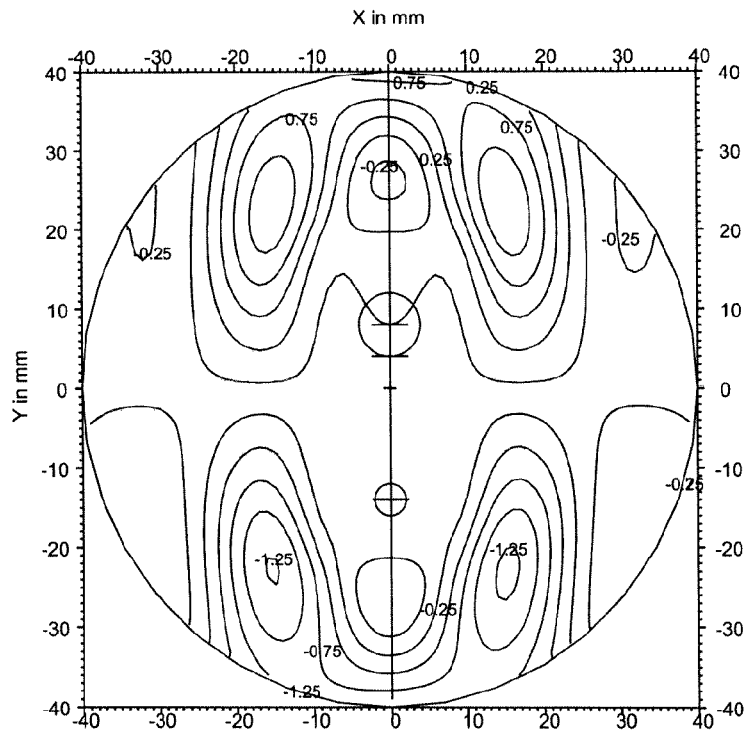
FIG. 38 shows a map for the entire first lens surface of the deviation of the mean sphere value from the sphere value at reference point x=0, y=0 according to the second embodiment of the invention.
Figure 39:
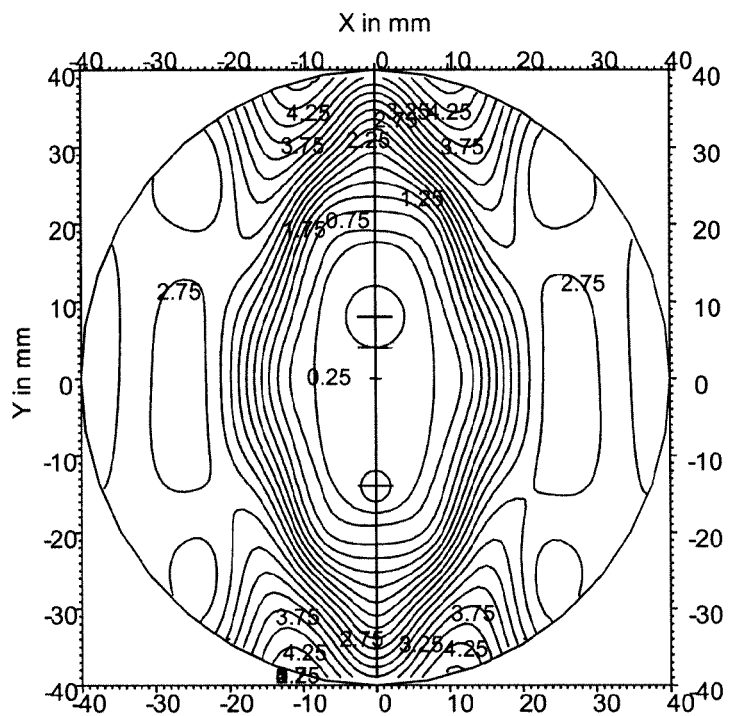
FIG. 39 shows a cylinder distribution map according to the second embodiment of the invention.
Figure 40:
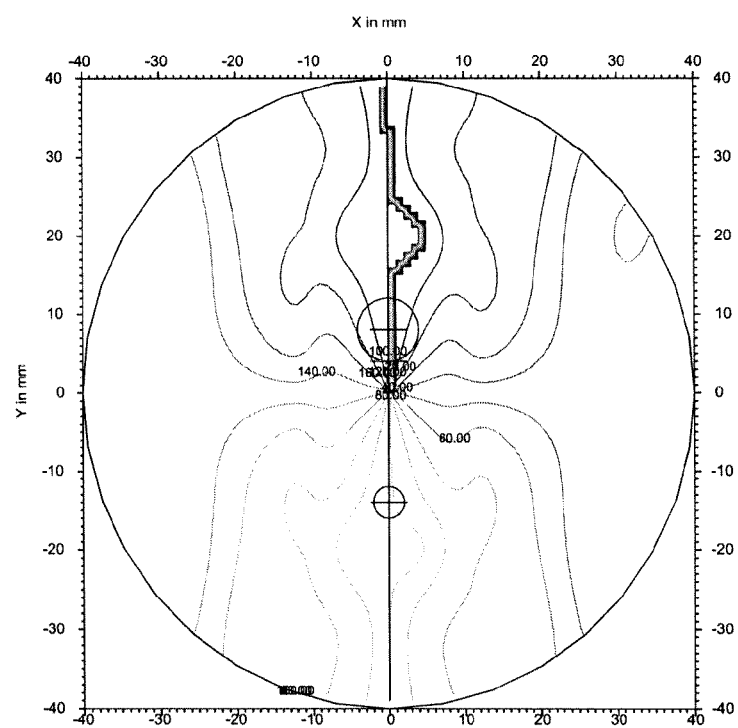
FIG. 40 shows a cylinder axis distribution map according to the second embodiment of the invention.
Figure 41:
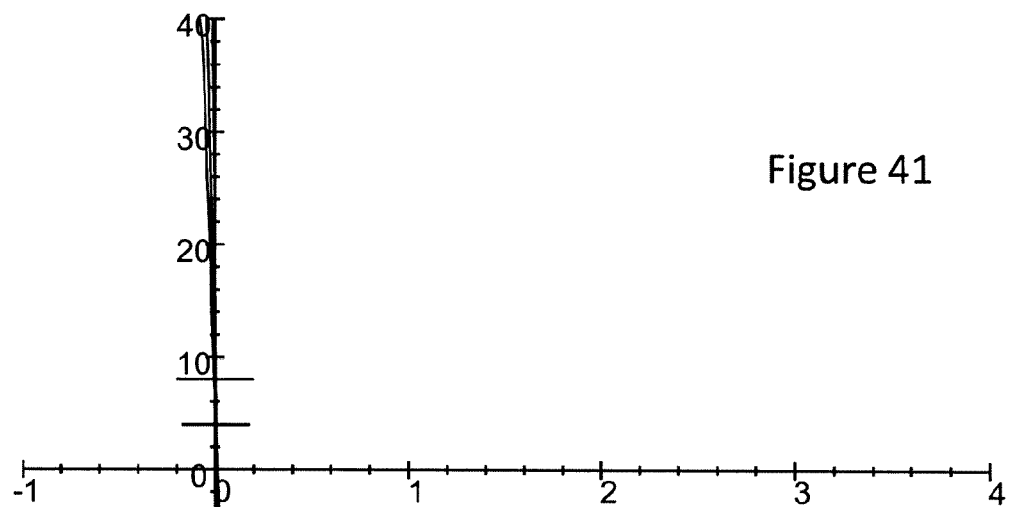
FIG. 41 shows a profile, for the first surface of a lens, of the deviation along the main meridian of the mean sphere value, minimum sphere value and maximum sphere value from the sphere value at reference point x=0, y=0 according to a third embodiment of the invention.
Figure 42:
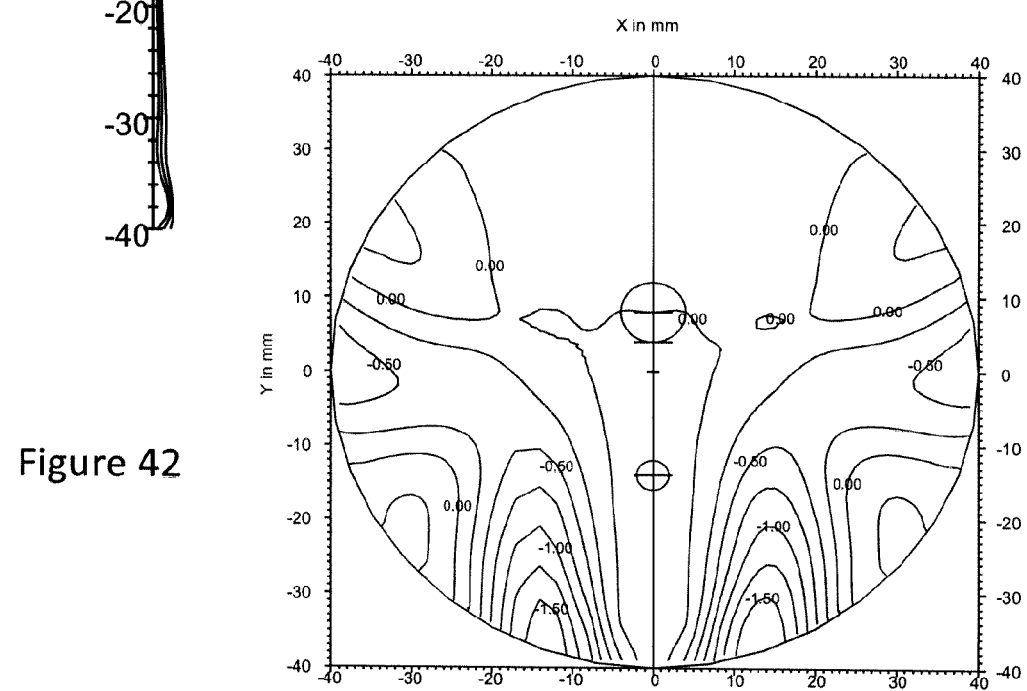
FIG. 42 shows a map for the entire first lens surface of the deviation of the mean sphere value from the sphere value at reference point x=0, y=0 according to the third embodiment of the invention.
Figure 43:
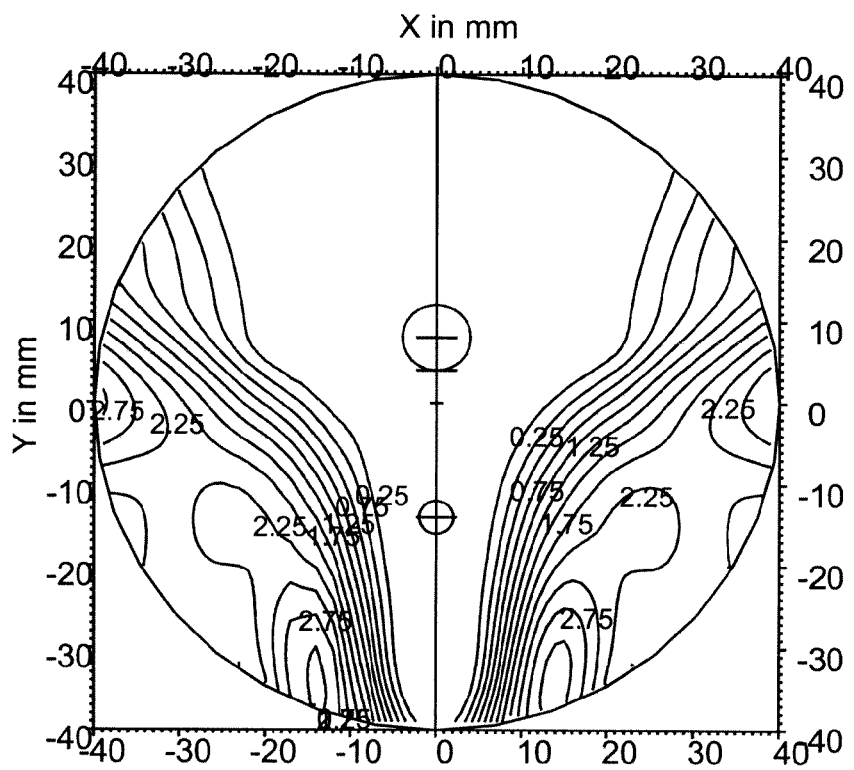
FIG. 43 shows a cylinder distribution map according to the third embodiment of the invention.
Figure 44:
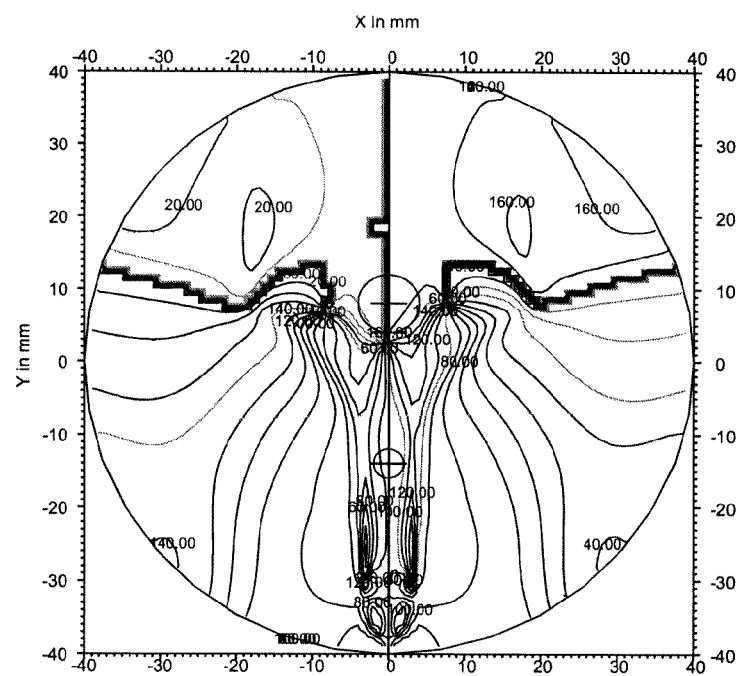
FIG. 44 shows a cylinder axis distribution map according to the third embodiment of the invention.

When a surface of the lens is considered, Portion1 and Portion2 are defined as the projection of the above defined portions on the surface. In an embodiment illustrated in FIGS. 29a and 30a, Portion1 (shown as a box outlined with dot-dash lines and separated into sections P1 and P3) could be delimited on the front surface by $-20$ mm$<x<-2.5$ mm and $4>y>-11$ mm, and Portion2 (not shown) could be delimited on the front surface by 2.5 mm$<x<20$ mm and $4>y>-11$ mm. In an embodiment illustrated in FIGS. 29b and 30b, Portion1 could be further delimited on the front surface by $-15$ mm$<x<-5$ mm and $0>y>-11$ mm (shown as a box outlined with dash lines and separated into sections P2 and P4), and Portion2 (not shown) could be further delimited on the front surface by 5 mm$<x<15$ mm and $0>y>-11$ mm The method also comprises a determining step 16 to accomplish the following.

A target optical function suited to the individual wearer is selected. The target optical function defines, for each gaze direction when the lens is worn, a refractive power ($P_{\alpha,\beta}$), a module of astigmatism ($Ast_{\alpha,\beta}$) and an axis of astigmatism ($\gamma_{\alpha,\beta}$), each gaze direction corresponding to a lowering angle ($\alpha$) and to an azimuth angle ($\beta$). It should be understood that the module and axis of astigmatism can refer to the prescribed astigmatism, or the total astigmatism, or the residual astigmatism. Each of the first surface and the second surface have in each point a mean sphere value (SPHmean), a cylinder value (CYL) and a cylinder axis ($\gamma_{AX}$). At least one first portion in the temporal area and at least one second portion in the nasal area are defined. For at least one of the first or the second portion of the first surface a reference axis of astigmatism $\gamma_{ref}$ being the average axis of astigmatism of the target optical function for gaze directions intersecting the first surface over the considered portion is determined. A cylinder axis value $\gamma_{AXi}$ in each point i of the considered portion presenting a cylinder value greater than 0.25D, $\gamma_{AXi}$ being defined in such a way that the sphere value (SPH($\gamma_{AXi}$)) along the cylinder axis $\gamma_{AXi}$ is greater than the sphere value (SPH($\perp\gamma_{AXi}$)) along a perpendicular axis to the cylinder axis $\gamma_{AXi}$ (SPH($\gamma_{AXi}$)>SPH($\perp\gamma_{AXi}$)) is determined An average cylinder axis value $\Gamma$, defined as the following expression, where N is the total number of points considered in the portion is determined $$\Gamma = \frac{\sum_{i=1}^{N} \gamma_{AXi}}{N}. \tag{1}$$

A minimum cylinder axis value Min$\Gamma$ (shown as MM axis P3 on FIG. 30a) and a maximum cylinder axis value Max$\Gamma$ (shown as Max axis P3 on FIG. 30a) among all the N axis values $\gamma_{AXi}$ considered are determined. The area P3 of the surface considered for this axis evaluation is shown cross-hatched within Portion1 on FIGS. 29a and 30a and, as stated above, each point i therein has a cylinder value greater than 0.25D. A differently-sized alternative area P4 is shown on FIGS. 29b and 30b, with its Min axis P4 and Max axis P4. A distance value D, defined as the distance in mm between the point of the considered portion presenting the minimum axis value and the point of the considered portion presenting the maximum axis value, is determined. A gradient value (Grad) of the cylinder axis is determined as the following expression (2):

$$Grad = \frac{Max\Gamma - Min\Gamma}{D}. \tag{2}$$

Thus, determining step 16 generates values for the parameters $\Gamma$, Grad and $\gamma_{ref}$.

The method further comprises a step 18 of modifying the first surface, using the parameters generated in step 16, so that it has the following characteristics.

a. The FV area is substantially spherical.
b. The FV and NV areas have equal mean sphere value.
c. On a least one portion, the following conditions apply:

Condition 1: The average cylinder axis value $\Gamma$ is preferably between +20° and −20° of the reference axis of astigmatism $\gamma_{ref}$.

Condition 2: Grad is preferably minimized. For example, the gradient value of the cylinder axis is preferably less than 5°/mm over the considered portion, more preferably less than 3°/mm over the considered portion, and even more preferably less than 2°/mm over the considered portion.

It has to be understood that step 16 and 18 can apply on portion 1 only, or on portion 2 only, or on both portion 1 and portion 2, each portion having its own $\Gamma$ and Grad values, denoted for example $\Gamma 1$ and $\Gamma 2$, Grad1 and Grad2.

The chart in FIG. 31 provides illustrative values for the above-mentioned parameters related to the third embodiment shown in FIGS. 41 to 44.

The chart in FIG. 32 provides illustrative values for the above-mentioned parameters related to the first and second embodiments shown in FIGS. 33 to 40.

Figure 20:
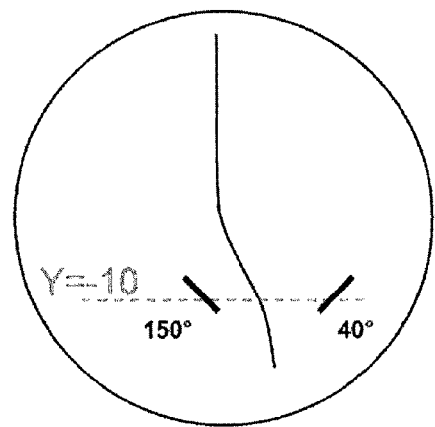
FIG. 20 shows schematically a front surface of a lens obtained by the method for determining a progressive lens according to an embodiment of the invention.

The method further comprises a step 20 of modifying the second aspherical surface so as to reach the target optical function for the lens and guarantee an optimum sharpness for the lens. The modifying of the second surface is carried out by optical optimization for minimizing the difference between a current optical function and the target optical function with a cost function. A cost function is a mathematical quantity expressing the distance between two optical functions. It can be expressed in different ways according to the optical criteria favored in the optimization. In the sense of the invention, "carrying out an optimization" should preferably be understood as "minimizing" the cost function. Of course, the person skilled in the art will understand that the invention is not limited to a minimization per se. The optimization could also be a maximization of a real function, according to the expression of the cost function which is considered by the person skilled in the art. Namely, "maximizing" a real function is equivalent to "minimizing" its opposite. With such conditions 1 and 2, the lens obtained (such as the one of FIG. 20) thus exhibits reduced distortion properties while guaranteeing the target optical function, the target optical function being defined to provide an optimal sharpness of the image to the wearer. Such effect can be qualitatively understood by the fact that the orientations of the curvatures for the first surface are modified which implies that the impact on the magnification of the lens is modified, resulting in a reduced distortion. In other words, the geometry of the first surface is chosen so that the distortion of the lens is reduced. The second surface is determined to ensure optimal optical performances impacting the sharpness of the image.

Steps 18 and 20 of modifying the first and second surfaces can be carried out by toggling between first and second surfaces with a first target optical function associated to the front surface dedicated to minimizing distortion and a second target optical function associated to the rear surface dedicated to ensuring sharpness of the lens. Such toggling between first and second surfaces optimization is described for instance in EP No. 2207118, the content of which is hereby incorporated herein by reference.

The determining step 16 of the method can be carried out in different ways.

For instance, the first and/or second reference axes $\Gamma_1$ and $\Gamma_2$ may further be determined based on the prescribed astigmatism or the total astigmatism or the residual astigmatism. The first and/or second reference axes $\Gamma_1$ and $\Gamma_2$ are therefore more relevantly determined, since they are suited to the wearer. Notably, when prescribed astigmatism is high, the axis of total astigmatism is equal to about the axis of prescribed astigmatism.

In the determining step 16, instead of considering mean values of the astigmatism axis for gaze directions belonging to Portion1 and to Portion2 to determine reference axes $\Gamma_1$ and/or $\Gamma_2$, one can consider the local value of astigmatism axis for each direction of gaze intersecting the first surface. Conditions 1 and 2 described above would apply for each point of Portion1 and/or Portion2 when modifying the first surface, each point being the intersection point between the said surface and the gaze direction.

According to another embodiment, each respective reference axis $\Gamma_1$ and/or $\Gamma_2$ may also be defined by optical optimization that minimizes the distortion over the respective portion Portion1 and Portion2. The optimization could also be a maximization of a real function. According to this embodiment, modifying the first and second surfaces can be carried out by toggling between first and second surfaces with a first target optical function that minimizes the distortion over the respective portion Portion1 and Portion2 and a second target optical function ensuring sharpness of the lens. Such toggling between first and second surfaces optimization is described in EP 2207118 previously mentioned.

Such embodiment with an optimization minimizing the distortion over the respective portions Portion1 and Portion2 enables determination of the reference axes $\Gamma_1$ and/or $\Gamma_2$ that give a lens with the most reduced distortion. In the following, a detailed way to carry out such optimization by using approximated analytical formulas is provided.

The optical power $P_{\alpha,\beta}(\theta)$ of the lens in a given gaze direction $(\alpha,\beta)$, along an axis forming an angle $\theta$ with the horizontal axis, is the combination of the spheres along this axis of the rear surface and the front surface. If $SPH\_front_{x,y}(\theta)$ is the sphere of the front face at the intersection point of the gaze direction $(\alpha,\beta)$ with the front surface, along the axis $\theta$, and $SPH\_rear_{x',y'}(\theta)$ is the sphere of the rear surface at the intersection point of the gaze direction $(\alpha,\beta)$ with the rear surface, the optical power along the axis $\theta$ is about the sum of these two quantities which means that $P_{\alpha,\beta}(\theta)=SPH\_front_{x,y}(\theta)+SPH\_rear_{x',y'}(\theta)$.

FIG. 5 is an illustration of this formula for a point of a front surface with a maximum sphere of 7.0 δ, a minimum sphere of 5.0 δ and a cylinder axis $\gamma_{AX}$ of 65° (curve 22 commented before) and a spherical rear surface (curve 42). As expected, the optical power $P_{\alpha,\beta}(\theta)$ (curve 44) of the lens for the gaze direction $(\alpha,\beta)$ along the axis is equal to the sum of the sphere of the front surface along the same axis in the corresponding point (x,y) and the sphere of the back surface along the same axis in the corresponding point (x',y'), the corresponding points are the intersection points between the gaze direction $(\alpha,\beta)$ and the surfaces. In this example, for simplicity, the thickness of the lens is considered to be equal to 0 mm so that x=x' and y=y'.

Then, approximation formulas enable one to give an estimation of the magnification along a given axis forming an angle $\theta$ with the horizontal axis as a function of optical power along this axis and the sphere of the front surface along the same axis in accordance with (19):

$$G_{\alpha,\beta}(\theta) = \frac{1}{1 - L \cdot P_{\alpha,\beta}(\theta)} \frac{1}{1 - \frac{t}{n} SPH\_front_{x,y}(\theta)}, \quad (19)$$

where $G_{\alpha,\beta}(\theta)$ is the magnification along the axis forming an angle $\theta$ with the horizontal axis, L is the distance from the eyeball side surface of the lens to the eye rotation center if central vision is considered or L is the distance from the eyeball side surface of the lens to pupil if peripheral vision is considered, t the thickness of the lens and n the refractive index of the lens.

Figure 21:
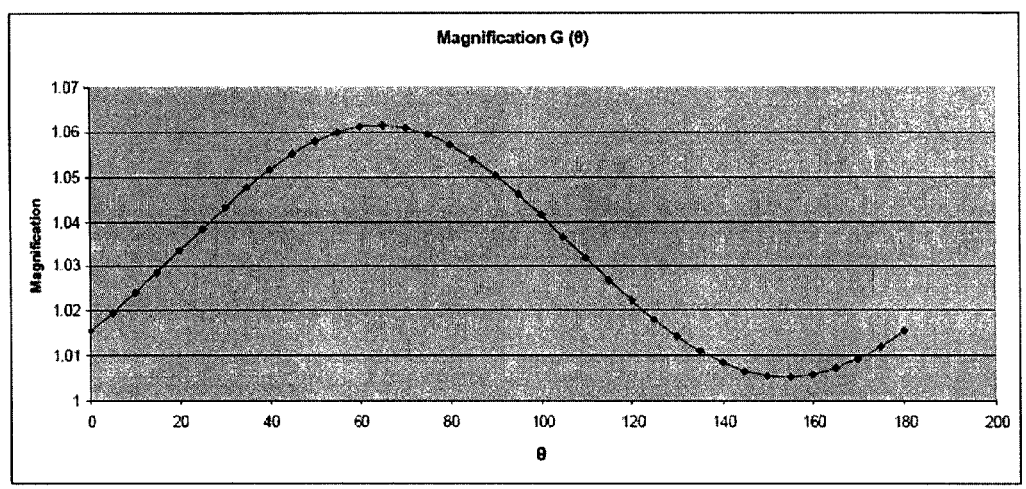
FIG. 21 shows the evolution of magnification value as a function of θ.

With the Gauss formula given before, the evolution of magnification $G_{\alpha,\beta}$ as a function of the angle $\theta$ is thus known. FIG. 21 is a representation of such variation for a gaze direction belonging to Portion1 (Temporal Area).

The axis of astigmatism is $\gamma$ as explained before. For any gaze direction, the axis of astigmatism is the axis along which the optical power is minimal. The maximum optical power is thus along the axis $\gamma+90°$. Accordingly, the minimum magnification is $G_{\alpha,\beta}(\gamma)$ and the maximum magnification is $G_{\alpha,\beta}(\gamma+90°)$. The quantity $DG_{\alpha,\beta}(\gamma)=G_{\alpha,\beta}(\gamma+90°)-G_{\alpha,\beta}(\gamma)$ is thus an evaluation of the difference of principal magnifications, which is the quantity that is searched to be minimized for each gaze direction $(\alpha,\beta)$. Indeed, the presence of this difference generates distortion.

With the above formula, the quantity $DG_{\alpha,\beta}(\gamma)=G_{\alpha,\beta}(\gamma+90°)-G_{\alpha,\beta}(\gamma)$ may be expressed. The minimum $G_{\alpha,\beta}(\gamma)$ magnification can thus be calculated by (20):

$$G_{\alpha,\beta}(\gamma) = \frac{1}{1-L*P(\gamma)} \frac{1}{1-\frac{t}{n}\text{SPH\_front}_{x,y}(\gamma)} \quad (20)$$

$$= \frac{1}{1-L*P_{min}} \frac{1}{1-\frac{t}{n}\text{SPH\_front}_{x,y}(\gamma)}.$$

Similarly, the maximum magnification $G(\gamma+90°)$ can also be calculated by (21):

$$G_{\alpha,\beta}(\gamma+90°) = \frac{1}{1-L*P(\gamma+90°)} \frac{1}{1-\frac{t}{n}\text{SPH\_front}_{x,y}(\gamma+90°)} \quad (21)$$

$$= \frac{1}{1-L*P_{max}} \frac{1}{1-\frac{t}{n}\text{SPH\_front}_{x,y}(\gamma+90°)}.$$

In fact, as the target optical function has already been defined, the values of minimal optical power $P_{min}$ and maximal optical power $P_{max}$ are imposed for any gaze direction. They should therefore be considered as constant in the formulas for the quantity $DG_{\alpha,\beta}(\gamma)$.

However, the value of the sphere of the front surface along the axis $\gamma$ and the value of the sphere of the front surface along the axis $\gamma+90°$ given by the Gauss formula depends on the cylinder axis. This implies that the value of $DG_{\alpha,\beta}(\gamma)$ depends on the chosen cylinder axis. In other words, $DG_{\alpha,\beta}(\gamma)$ is a function of $\gamma_{AX}$. This function when represented enables one to obtain FIG. 22. The example was carried out with a value of L of 25 mm for the distance from the eyeball side surface of the lens to the eyeball, a value t of 1.4 mm for the thickness of the lens and a value n of 1.665 for the refractive index.

Figure 22:
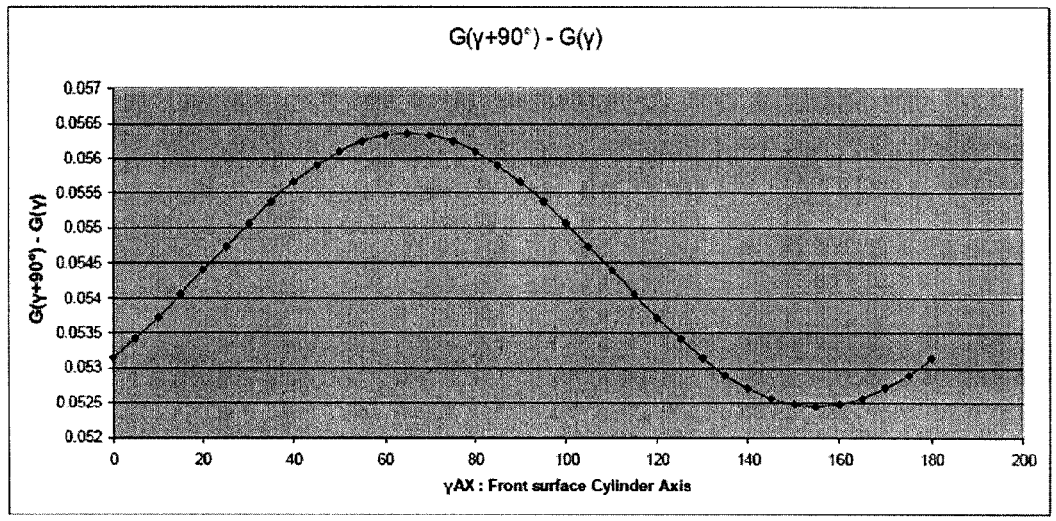
FIG. 22 shows the evolution for one gaze direction of the difference between the magnification along the axis of astigmatism of the lens and the magnification along the axis perpendicular to the axis of astigmatism of the lens as a function of the cylinder axis of the front surface.

The graphic of FIG. 22 shows that the quantity $DG_{\alpha,\beta}(\gamma)$ is minimal for a value of the cylinder axis. In case of the temporal area, the value obtained is 155°. A similar calculation made for the nasal area would lead to a value of 40°. By choosing the reference axes $\Gamma_1$ and $\Gamma_2$ as being equal to these values ($\Gamma_1=155°$ and $\Gamma_2=40°$), the quantity $DG_{\alpha,\beta}(\gamma)$ will be minimized, resulting in a reduced distortion. An example of carrying out of an optimization for the step 16 of the method according to the flowchart of FIG. 18 has thus been described.

Figure 25:
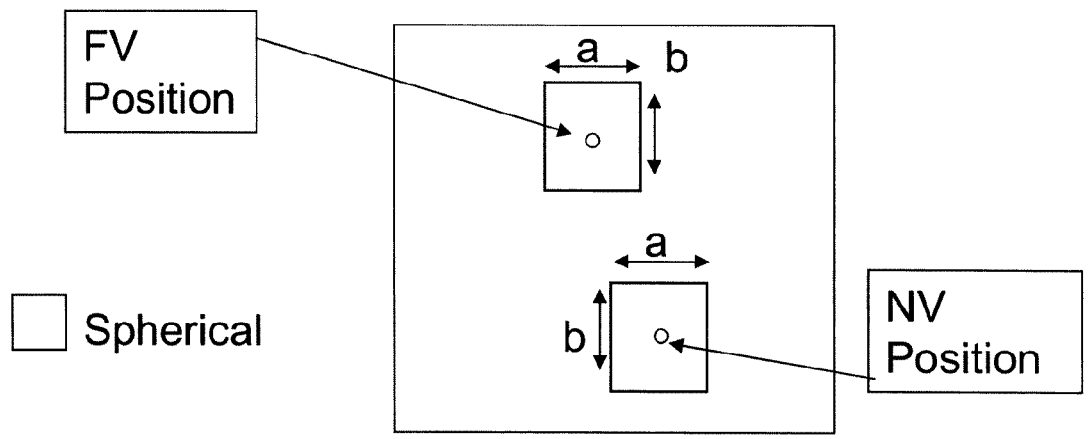
FIG. 25 shows a first surface of a lens in which a spherical portion includes the FV and NV positions of an individual wearer.

FIG. 25 shows surface characteristics for a first surface of a lens according to an example embodiment. For example, the first surface can be the front surface of a lens. A spherical area (cylinder <0.25D) of the first surface of the lens, which has a substantially constant sphere value (+0.25D), includes the FV position and the NV position of an individual wearer. A first part of the spherical area includes the FV position and a second part of the spherical area includes the NV position. The first part of the spherical area including the FV position is separate from, i.e., not connected on the first surface of the lens, the second part of the spherical area including the NV position. A size of each of the first and second part of the spherical area is defined by a reference distance (width) 'a' and a reference distance (height) 'b', the FV or NV position being centered at its respective part of the spherical area defined by the reference distance 'a' and the reference distance 'b'.

Advantageous results can be obtained with using only the first part of the spherical area, i.e., that surrounding the FV position. Further improvement is derived from also using only the second part of the spherical area, i.e., that surrounding the NV position.

For the first part of the spherical area including the FV position, the reference distance 'a' is preferably set to be greater than two times the misalignment error (Tx) in the X axis (horizontal axis) direction of the lens due to the manufacturing process, and the reference distance 'b' is set to be greater than two times the misalignment error (Ty) in the Y axis (vertical axis) direction of the lens due to the manufacturing process. Similarly, for the second part of the spherical area including the NV position, the reference distance 'a' is greater than two times the misalignment error (Tx) in the X axis (horizontal axis) direction of the lens, and the reference distance 'b' is greater than two times the misalignment error (Ty) in the Y axis (vertical axis) direction of the lens. The toric or cylinder area (cylinder>0.25D) is formed on the first surface outside the above-described first and second parts constituting the spherical area.

Figure 26:
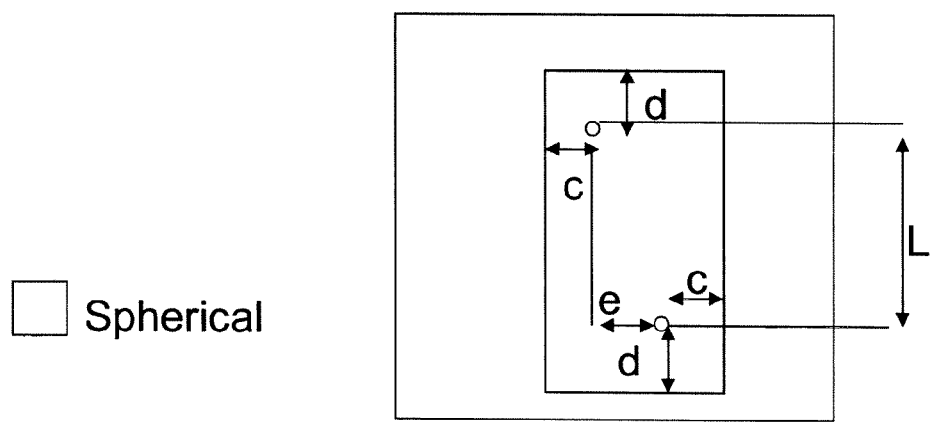
FIG. 26 shows a first surface of a lens in which a spherical portion includes the FV and NV positions and the meridian therebetween.

FIG. 26 shows surface characteristics for a first surface of a lens according to another example embodiment. A spherical area of the lens, which has a substantially constant sphere value, includes the FV position and the NV position of an individual wearer, as well as the meridian therebetween. An inset 'e' defines a distance in the X axis (horizontal axis) direction between the FV position and the NV position of the individual wearer. A length 'L' defines a distance in the Y axis (vertical axis) direction between the FV position and the NV position of the individual wearer. From the FV position, a reference distance 'c' defines a distance that the spherical area extends in the X axis (horizontal axis) from the FV position toward the temporal edge of the lens, and a reference distance 'd' defines a distance that the spherical area extends in the Y axis (vertical axis) direction from the FV position toward the top edge of the lens. From the NV position, the reference distance 'c' defines a distance that the spherical area extends in the X axis (horizontal axis) from the NV position toward the nasal edge of the lens, and the reference distance 'd' defines a distance that the spherical area extends in the Y axis (vertical axis) direction from the NV position toward the bottom edge of the lens.

The reference distance 'c' is greater than the misalignment error (Tx) in the X axis (horizontal axis) direction of the lens. The reference distance 'd' is greater than the misalignment error (Ty) in the Y axis (vertical axis) direction of the lens. The size of the spherical area is thus defined by the inset 'e', the length 'L' and the reference distances 'c' and 'd' from each of the FV position and the NV position. The toric or cylinder area is formed on the first surface of the lens outside the spherical area.

Figure 27:
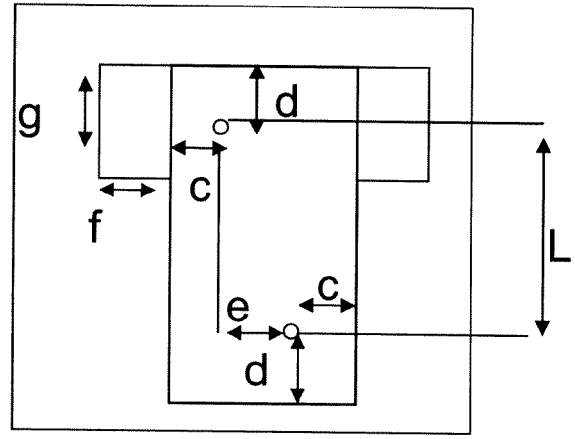
FIG. 27 shows a first surface of a lens in which a spherical portion further includes portions of the nasal and temporal areas in the far vision area of the lens.

FIG. 27 shows surface characteristics for a first surface of a lens according to still another example embodiment. A main spherical area of the lens, which has a substantially constant sphere value, includes the FV position and the NV position of an individual wearer, and the meridian therebetween, as in the embodiment of FIG. 26. In addition, first and second extensions into the nasal and temporal areas can be provided in the FV area of the lens. The size of the main spherical area may be defined by the inset 'e', the length 'L' and the references 'c' and 'd' from each of the FV position and the NV position. Sizes of the first extension and the second extension may each be defined by the reference distances 'g' and 'f'.

The first extension of the spherical area extends in the temporal area in the FV area of the lens from a main area of the spherical area by a distance 'f' in the X axis (horizontal axis) direction from an edge of the main spherical area defined by the reference distance 'c' at the FV position toward the temporal edge of the lens. The first extension of the spherical area extends in the temporal area in the FV area of the lens by a distance 'g' in the Y axis (vertical axis) direction from a top of the main spherical area defined by the reference distance 'd' at the FV position toward the bottom of the lens. Similarly, the second extension of the spherical area extends in the nasal area in the FV area of the lens by a distance 'f' in the X axis (horizontal axis) direction from an edge of the main spherical area defined by the inset distance 'e' added to the reference distance 'c' at the FV position toward a nasal edge of the lens. The second extension of the spherical area extends in the nasal area in the FV area of the lens by a distance 'g' in the Y axis (vertical axis) direction from a top of the main spherical area defined by the reference distance 'd' at the FV position toward the bottom of the lens. The second extension of the spherical area is thus defined in the nasal area of the FV area of the lens.

The reference distance 'c' is greater than the misalignment error (Tx) in the X axis (horizontal axis) direction of the lens. The reference distance 'd' is greater than the misalignment error (Ty) in the Y axis (vertical axis) direction of the lens. The reference distance 'f' is greater than 5 mm. The reference distance 'g' is greater than 5 mm. The toric or cylinder area is formed on the first surface outside the main spherical area and the first and second extensions of the main spherical area.

Figure 28:
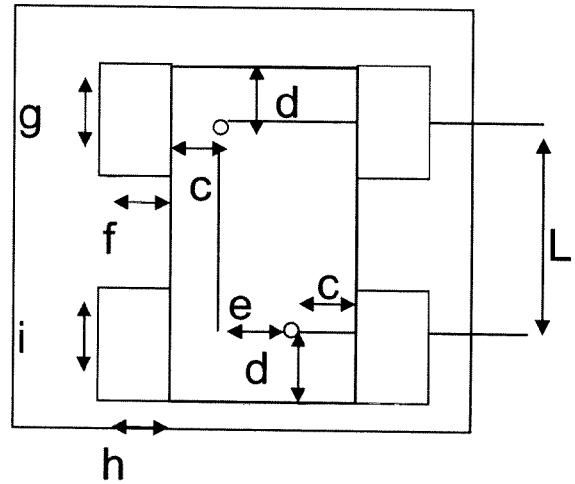
FIG. 28 shows a first surface of a lens in which a spherical portion further includes portions of the nasal and temporal areas in each of the far vision area and the near vision area of the lens.

FIG. 28 shows surface characteristics for a first surface of a lens according to a further example embodiment. The first surface has a main spherical area of the lens, which has a substantially constant sphere value and includes the FV position and the NV position of an individual wearer, and the meridian therebetween. Also included are the first and second extensions into the nasal and temporal areas in the FV area of the lens. So far, this embodiment is as shown in FIG. 27.

In addition, the embodiment of FIG. 28 includes third and fourth extensions into the nasal and temporal areas in the NV area of the lens. The size of the main spherical area and the first and second extensions may be defined as described above in connection with FIG. 27. The area of the third and fourth extensions into the nasal and temporal area in the NV area of the lens is defined by the reference distances 'i' and 'h'.

The third extension of the spherical area extends into the temporal area in the NV area of the lens by a distance 'h' in the X axis (horizontal axis) direction from an edge of the main spherical area defined by the inset distance 'e' and the reference distance 'c' from the FV position toward a temporal edge of the lens. The third extension of the spherical area extends in the temporal area in the NV area of the lens by a distance 'i' in the Y axis (vertical axis) direction from a bottom of the main spherical area defined by the reference distance 'd' from the NV position. The third extension area of the main spherical area is thus defined in the temporal area of the NV area of the lens. Similarly, the fourth extension of the spherical area extends into the nasal area in the NV area of the lens by a distance 'h' in the X axis (horizontal axis) direction from an edge of the main spherical area defined by the reference distance 'c' toward a nasal edge of the lens. The fourth extension of the spherical area extends in the nasal area in the NV area of the lens by the distance 'i' in the Y axis (vertical axis) direction from the bottom of the main spherical area defined by the reference distance 'd' from the NV position. A fourth extension area of the main spherical area is thus defined in the nasal area of the NV area of the lens. The reference distance 'h' is greater than 2 mm. The reference distance 'i' is greater than 5 mm. The toric or cylinder area is formed on the first surface outside the spherical area including between the first and third extensions of the spherical area and between the second and fourth extensions of the spherical area.

Each one of the lenses previously described may be obtained by the method of determining a progressive ophthalmic lens previously described. This method can be implemented on a computer. In this context, unless specifically stated otherwise, it is appreciated that throughout this specification discussions utilizing terms such as "computing", "calculating," "generating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

A computer program product comprising one or more stored sequence of instruction that is accessible to a processor and which, when executed by the processor, causes the processor to carry out the steps of the method is also proposed.

Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus. A computer-readable medium carrying one or more sequences of instructions of the computer program product is thus proposed. This enables one to carry out the method in any location.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Many apparatuses or processes may be used to obtain the pair of lenses using a first surface of a lens determined according to the method previously described. The processes often imply an exchange of a set of data. For instance, this set of data may comprise only the first surface of a lens determined according to the method. This set of data may preferably further comprise data relating to the eyes of the wearer such that with this set, the progressive ophthalmic lens can be manufactured.

Figure 23:
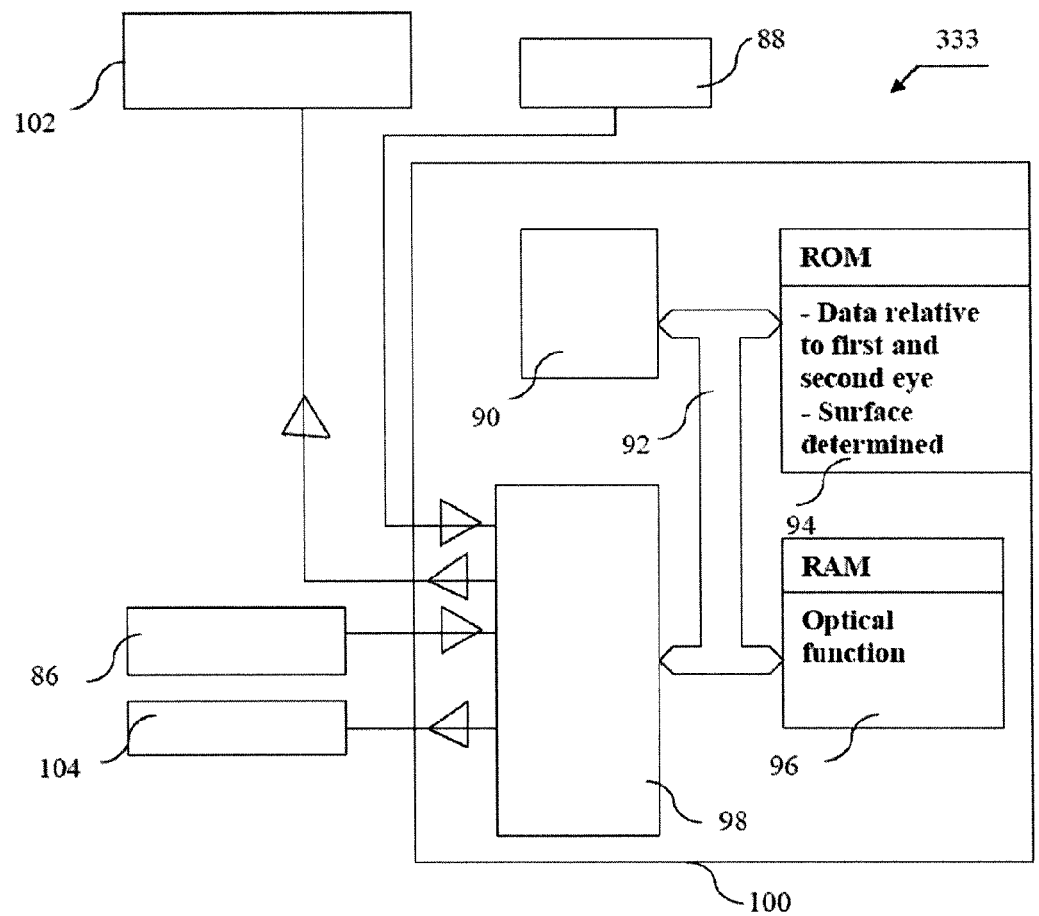
FIG. 23 illustrates an apparatus for processing the method according to an embodiment of the invention.

This exchange of data may be schematically understood by the apparatus of FIG. 23 which represents an apparatus 333 for receiving numerical data. It comprises a keyboard 88, a display 104, an external information center 86, a receiver of data 102, linked to an input/output device 98 of an apparatus for data processing 100 which is realized there as a logic unit.

The apparatus for data processing 100 comprises, linked between them by a data and address bus 92: a central processing unit 90; a RAM memory 96; a ROM memory 94; and said input/output device 98.

Said elements illustrated in FIG. 23 are well known for the person skilled in the art. Those elements are not described any further.

To obtain a progressive ophthalmic lens corresponding to a wearer prescription, semi-finished ophthalmic lens blanks can be provided by a lens manufacturer to the prescription labs. Generally, a semi-finished ophthalmic lens blank comprises a first surface corresponding to an optical reference surface, for example a progressive surface in the case of progressive addition lenses, and a second unfinished surface. A semi-finished lens blank having suitable optical characteristics, is selected based on the wearer prescription. The unfinished surface is finally machined and polished by the prescription lab so as to obtain a surface complying with the prescription. An ophthalmic lens complying with the prescription is thus obtained.

Notably, according to the invention, semi-finished lens blanks can be provided with a first surface meeting the conditions previously described with reference to the first surface of a progressive ophthalmic lens.

To provide such semi-finished lens blanks, a target optical function must be chosen for each set of prescriptions (similarly to step 10 in FIG. 18). A first aspherical surface and a second unfinished surface are defined (similarly to step 12 in FIG. 18). At least one reference axis $\Gamma_1$ or $\Gamma_2$ is determined not only based on the mean axis of astigmatism $\gamma_T$ and $\gamma_N$ of the target optical function for gaze directions belonging to Portion1 and Portion2 but also on mean axis of astigmatism for lenses of the set of prescriptions. The first aspherical surface of the semi-finished lens blank is then modified to meet some conditions.

Figure 24:
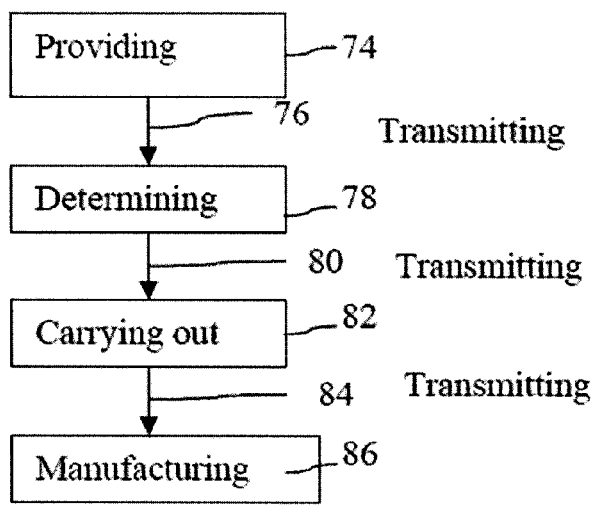
FIG. 24 is a flow chart of a method for manufacturing a lens according to an embodiment of the invention.

However, other method for manufacturing may be used. The method according to FIG. 24 is an example. The method for manufacturing comprises a step 74 of providing data relating to the eyes of the wearer at a first location. The data are transmitted from the first location to a second location at the step 76 of the method. The progressive ophthalmic lens is then determined at step 78 at the second location according to the method for determining previously described. The method for manufacturing further comprises a step 80 of transmitting relative to the first surface to the first location. The method also comprises a step 82 of carrying out an optical optimization based on the data relative to the first surface transmitted. The method further encompasses a step of transmitting 84 the result of the optical optimization to a third location. The method further encompasses a step of manufacturing 86 the progressive ophthalmic lens according to the result of the optical optimization.

Such method of manufacturing makes it possible to obtain a progressive ophthalmic lens with a reduced distortion without degrading the other optical performances of the lens.

The transmitting steps 76 and 80 can be achieved electronically. This enables acceleration of the method. The progressive ophthalmic lens is manufactured more rapidly.

To improve this effect, the first location, the second location and the third location may just be three different systems, one devoted to the collecting of data, one to calculation and the other to manufacturing, the three systems being situated in the same building. However, the three locations may also be three different companies, for instance one being a spectacle seller (optician), one being a laboratory and the other one a lens designer.

A set of apparatuses for manufacturing a progressive ophthalmic lens, wherein the apparatuses are adapted to carry out the method for manufacturing is also disclosed.

The invention is further illustrated by the use of the examples below.

FIGS. 33 to 36 depict a first surface of a lens obtained in accordance with a first embodiment of the invention.

FIGS. 37 to 40 depict a first surface of a lens obtained in accordance with a second embodiment of the invention.

FIGS. 41 to 44 depict a first surface of a lens obtained in accordance with a third embodiment of the invention. It is noted that FIGS. 29 and 30 correspond to FIGS. 43 and 44, respectively.

Although preferred embodiments have been disclosed in detail above, it will be apparent to anyone with ordinary skill in the art that various modifications thereto can be readily made. All such modifications are intended to fall within the scope of the present invention as defined by the following claims.

The invention claimed is:

1. A method implemented by computer means, for determining a progressive ophthalmic lens with vision correcting properties related to a prescription of an individual wearer and enabling reduction of lens distortion of a lens, the lens to comprise a near vision area, a far vision area, and a main meridian separating the lens into a nasal area and a temporal area, the method comprising:
providing a misalignment error (Tx) in an X axis direction of the lens due to a manufacturing process to be used to manufacture the lens,
providing a misalignment error (Ty) in a Y axis direction of the lens due to the manufacturing process to be used to manufacture the lens,
determining a first surface and a second surface of the lens;
determining the second surface to provide, in combination with the first surface, all vision correcting properties related to the prescription of the individual wearer;
determining a spherical area on the first surface of the lens having a substantially constant sphere value, and including within the spherical area a far vision diopter measurement position of the individual wearer, the far vision diopter measurement position ("FV position") and a near vision diopter measurement position ("NV position") of the individual wearer having substantially a same mean sphere value; and determining the first surface to reduce the lens distortion by defining a toric area extending outside the spherical area on the first surface in at least one of the nasal area and the temporal area, such that characteristics of the toric area are related to astigmatism, the spherical area having a first part and a second part, with the first part including the FV position and the second part including the NV position, said first part being separated from or continuous with the second part, the size of each of the first part and the second part of the spherical area being defined by a reference width 'a' and a reference height 'b', the FV or NV position being centered at its respective part of the spherical area defined by the reference distance 'a' and the reference distance 'b', whereby for the first part of the spherical area including the FV position, the reference distance 'a' is set to be greater than two times the misalignment error (Tx) in the X axis direction of the lens due to the manufacturing process, and the reference distance 'b' is set to be greater than two times the misalignment error (Ty) in the Y axis direction of the lens due to the manufacturing process, and for the second part of the spherical area including the NV position, the reference distance 'a' is greater than two times the misalignment error (Tx), and the reference distance 'b' is greater than two times the misalignment error (Ty).

2. The method of claim 1, wherein the nasal area and the temporal area are symmetrical to each other relative to a YZ plane.

3. The method of claim 1, wherein the spherical area of the lens comprises a main spherical area including therein the first part being continuous with the second part, said main spherical area including therein the FV position and the NV position of the individual wearer, as well as the main meridian therebetween, an inset 'e' defining a distance in the X axis direction between the FV position and the NV position of the individual wearer, a length 'L' defining a distance in the Y axis direction between the FV position and the NV position of the individual wearer, wherein from the FV position, a reference distance 'c' defines a distance that the spherical area extends in the X axis direction from the FV position toward a temporal edge of the lens, and a reference distance 'd' defines a distance that the spherical area extends in the Y axis direction from the FV position toward a top edge of the lens, wherein from the NV position, the reference distance 'c' defines a distance that the spherical area extends in the X axis from the NV position toward a nasal edge of the lens, and the reference distance 'd' defines a distance that the spherical area extends in the Y axis direction from the NV position toward a bottom edge of the lens, and wherein the reference distance 'c' is set to be greater than the misalignment error (Tx) in the X axis direction of the lens due to the manufacturing process, and the reference distance 'd' is set to be greater than the misalignment error (Ty) in the Y axis direction of the lens due to the manufacturing process.

4. The method of claim 3, wherein the spherical area of the first surface of the lens comprises the main spherical area, and first and second extensions into the nasal and temporal areas in the far vision area of the lens, wherein sizes of the first extension and the second extension are each defined by reference distances 'g' and 'f', wherein the first extension of the spherical area extends in the temporal area in the far vision area of the lens from the main spherical area by the reference distance 'f' in the X axis direction from an edge of the main spherical area defined by the reference distance 'c' at the FV position toward the temporal edge of the lens, and the first extension of the spherical area extends in the temporal area in the far vision area of the lens by the reference distance 'g' in the Y axis direction from a top of the main spherical area defined by the reference distance 'd' at the FV position toward the bottom edge of the lens, wherein the second extension of the spherical area extends in the nasal area in the far vision area of the lens by the reference distance 'f' in the X axis direction from an edge of the main spherical area defined by the inset distance 'e' added to the reference distance 'c' at the FV position toward the nasal edge of the lens, and the second extension of the spherical area extends in the nasal area in the far vision area of the lens by the reference distance 'g' in the Y axis direction from the top of the main spherical area defined by the reference distance 'd' at the FV position toward the bottom edge of the lens, and wherein the reference distance 'c' is greater than the misalignment error (Tx) in the X axis direction of the lens, the reference distance 'd' is greater than the misalignment error (Ty) in the Y axis direction of the lens, the reference distance 'f' is greater than 5 mm, and the reference distance 'g' is greater than 5 mm.

5. The method of claim 4, wherein the spherical area of the lens comprises the main spherical area, the first and second extensions into the nasal and temporal areas in the far vision area of the lens, and third and fourth extensions into the nasal and temporal areas in the near vision area of the lens, with areas of the third and fourth being defined by reference distances 'i' and 'h', respectively, wherein the third extension of the spherical area extends into the temporal area in the near vision area of the lens by the reference distance 'h' in the X axis direction from an edge of the main spherical area defined by the inset distance 'e' and the reference distance 'c' from the FV position toward the temporal edge of the lens, and the third extension of the spherical area extends in the temporal area in the near vision area of the lens by the reference distance 'i' in the Y axis direction from a bottom of the main spherical area defined by the reference distance 'd' from the NV position, wherein the fourth extension of the spherical area extends into the nasal area in the near vision area of the lens by the reference distance 'h' in the X axis direction from an edge of the main spherical area defined by the reference distance 'c' toward the nasal edge of the lens, and the fourth extension of the spherical area extends in the nasal area in the near vision area of the lens by the reference distance 'i' in the Y axis direction from the bottom of the main spherical area defined by the reference distance 'd' from the NV position, and wherein the reference distance 'h' is greater than 2 mm, and the reference distance 'i' is greater than 5 mm.

6. A method for determining a progressive ophthalmic lens with vision correcting properties related to a prescription of an individual wearer and enabling reduction of distortion of a lens, the lens to comprise a near vision area, a far vision area, and a main meridian separating the lens into a nasal area and a temporal area, the method comprising the steps of:

defining a target optical function suited to the individual wearer, the target optical function defining, for each gaze direction when the lens is worn, a refractive power ($P_{\alpha,\beta}$), a module of astigmatism ($Ast_{\alpha,\beta}$) and an axis of astigmatism ($\gamma_{\alpha,\beta}$), each gaze direction corresponding to a lowering angle ($\alpha$) and to an azimuth angle ($\beta$), wherein the module of astigmatism and the axis of astigmatism refer to prescribed astigmatism, or a total astigmatism, or a residual astigmatism;

determining a first surface and a second surface of the lens, each of the first surface of the lens and the second surface of the lens having at each point a mean sphere value (SPHmean), a cylinder value (CYL) and a cylinder axis ($\gamma_{AX}$);

defining at least one first portion in the temporal area the first portion having an area of at least 25 mm² and defining at least one second portion in the nasal area the second portion having an area of at least 25 mm²;

for at least one of the first portion and the second portion of the first surface, determining a reference axis of astigmatism $\gamma_{ref}$ that is an average axis of astigmatism of the target optical function for gaze directions intersecting the first surface over at least one considered portion of the first surface;

for at least one of the first portion and the second portion of the first surface, determining a cylinder axis value $\gamma_{ref}$ for each point i of the considered portion presenting a cylinder value greater than 0.25D, $\gamma_{AXi}$ being defined in such a way that the sphere value (SPH($\gamma_{AXi}$)) along the cylinder axis value $\gamma_{AXi}$ is greater than a sphere value (SPH($\perp\gamma_{AXi}$)) along a perpendicular axis to the cylinder axis value $\gamma_{AXi}$, in which SPH($\gamma_{AXi}$)>SPH($\perp\gamma_{AXi}$);

for at least one of the first portion and the second portion of the first surface, determining an average cylinder axis value $\Gamma$, defined by expression (1), where N is a total number of points considered, $$\Gamma = \frac{\sum_{i=1}^{N} \gamma_{AXi}}{N}, \quad (1)$$

for at least one of the first portion and the second portion of the first surface, determining a minimum cylinder axis value Min$\Gamma$ and a maximum cylinder axis value Max$\Gamma$ among all the N for the cylinder axis value $\gamma_{AXi}$ considered;

for at least one of the first portion and the second portion of the first surface, determining a distance value D, defined as a distance in mm between a point of the at least one considered portion presenting a minimum axis value and the point of the at least one considered portion presenting a maximum axis value;

for at least one of the first portion and the second portion of the first surface, determining a gradient value (Grad) of the cylinder axis by expression (2)

$$Grad = \frac{Max\Gamma - Min\Gamma}{D}; \quad (2)$$

modifying the first surface so that on at least one of the first and second portions, Condition 1 and Condition 2 apply, in which in Condition 1 the average cylinder axis value $\Gamma$ determined for the respective at least one portion is between +20° and −20° of the reference axis of astigmatism $\gamma_{ref}$ for such portion, and in Condition 2 the gradient value (Grad) of the cylinder axis determined for the respective at least one portion is less than 5°/mm over the at least one considered portion.

7. A computer program product stored on a non-transitory computer memory and executed on a processor that when used on a computer apparatus causes the processor to carry out a method for determining a progressive ophthalmic lens with vision correcting properties related to prescription of an individual wearer and enabling reduction of lens distortion, the method comprising one or more of the steps of claim 1.

8. A non-transitory computer readable medium storing a computer program that when executed by a processor on a computer apparatus causes the processor to execute the method for determining a progressive ophthalmic lens with vision correcting properties related to prescription of an individual wearer and enabling reduction of lens distortion, the method including one or more sequences of instructions of the computer program product of claim 7.

9. The method of claim 1 further comprising storing a set of data comprising data relating to the first surface of the lens.

10. The method of claim 1 further comprising manufacturing a progressive ophthalmic lens comprising the steps of:
providing data relative to eyes of the individual wearer;
transmitting data relative to the individual wearer;
determining the first surface of the lens according to the method of claim 1;
transmitting data relative to the first surface;
carrying out an optical optimization of the lens based on the transmitted data relative to the first surface;
transmitting the result of the optical optimization; and
manufacturing the progressive ophthalmic lens according to the result of the optical optimization.

11. A progressive ophthalmic lens with vision correcting properties related to prescription of an individual wearer and enabling reduction of lens distortion, the lens comprising a near vision area and a far vision area, and a main meridian separating the lens into a nasal area and a temporal area, the lens further comprising:

a first surface and a second surface, the second surface being configured to provide, in combination with the first surface, all of the vision correcting properties related to the prescription of the individual wearer;

a spherical area on the first surface of the lens having a substantially constant sphere value, and including within the spherical area a far vision diopter measurement position of the individual wearer, wherein the far vision diopter measurement position ("FV position") and a near vision diopter measurement position ("NV position") of the individual wearer have substantially a same mean sphere value; and a toric area on the first surface to reduce the lens distortion, said toric area extending outside the spherical area on the first surface in at least one of the nasal area and the temporal area, wherein characteristics of the toric area are related to astigmatism, the progressive ophthalmic lens having when being worn and for each gaze direction a refractive power ($P_{\alpha,\beta}$), a module of astigmatism ($Ast_{\alpha,\beta}$) and an axis of astigmatism ($\gamma_{\alpha,\beta}$), each gaze direction corresponding to a lowering angle ($\alpha$) and to an azimuth angle ($\beta$), the module of astigmatism and the axis of astigmatism referring to prescribed astigmatism, or total astigmatism, or residual astigmatism;

each of the first surface and the second surface having at each point the mean sphere value (SPHmean), a cylinder value (CYL) and a cylinder axis ($\gamma_{AX}$);

the first surface further comprising:
  at least one first portion in the temporal area, the first portion having an area of at least 25 mm²; and
  at least one second portion in the nasal area the second portion having an area of at least 25 mm²; and for at least one of the first portion and the second portion of the first surface, a reference axis of astigmatism $\gamma_{ref}$ is an average axis of astigmatism of a target optical function for gaze directions intersecting the first surface over a considered portion of the first surface;

for at least one of the first portion and the second portion of the first surface, a cylinder axis value $\gamma_{AXi}$ for each point i of the considered portion presents a cylinder value greater than 0.25D, $\gamma_{AXi}$ being defined in such a way that a sphere value (SPH($\gamma_{AXi}$)) along the cylinder axis value $\gamma_{AXi}$ is greater than the sphere value (SPH($\perp\gamma_{AXi}$)) along a perpendicular axis to the cylinder axis value $\gamma_{AXi}$ (SPH($\gamma_{AXi}$)>SPH($\perp\gamma_{AXi}$));

for at least one of the first portion and the second portion of the first surface, an average cylinder axis value $\Gamma$, defined by expression (1), where N is a total number of points considered, $$\Gamma = \frac{\sum_{i=1}^{N} \gamma_{AXi}}{N}, \quad (1)$$

for at least one of the first portion and the second portion of the first surface, a minimum cylinder axis value Min$\Gamma$ and a maximum cylinder axis value Max$\Gamma$ among all N axis values $\gamma_{AXi}$ considered;

for at least one of the first portion and the second portion of the first surface, a distance value D, defined as a distance in mm between a point of the considered portion presenting the minimum axis value and a point of the considered portion presenting the maximum axis value;

for at least one of the first portion and the second portion of the first surface, a gradient value (Grad) of the cylinder axis by expression (2):

$$Grad = \frac{Max\Gamma - Min\Gamma}{D}, \quad (2)$$

for the first surface on at least one of the first and second portions, Condition 1 and Condition 2 apply, in which in Condition 1 an average cylinder axis value $\Gamma$ determined for the respective at least one portion is between +20° and −20° of the reference axis of astigmatism $\gamma_{ref}$ for such portion, and in Condition 2, the gradient value (Grad) of the cylinder axis determined for the respective at least one portion is less than 5°/mm over the considered portion.

12. A method for manufacturing a semi-finished lens blank having a near vision area and a far vision area, and a main meridian separating the lens into a nasal area and a temporal area, the method comprising:

determining a first surface and a second unfinished surface of a lens;

determining a spherical area on the first surface of the lens having a substantially constant sphere value, and including within the spherical area a far vision diopter measurement position of an individual wearer, wherein the far vision diopter measurement position ("FV position") and a near vision diopter measurement position ("NV position") of the individual wearer have substantially a same mean sphere value;

determining the first surface to reduce distortion of a lens to be manufactured from the lens by defining a toric area extending outside the spherical area on the first surface in at least one of the nasal area and the temporal area, wherein characteristics of the toric area are related to astigmatism;

defining a target optical function suited to a predetermined range of prescriptions for the individual wearer, the target optical function defining, for each gaze direction when a lens is worn, a refractive power ($P_{\alpha,\beta}$), a module of astigmatism ($Ast_{\alpha,\beta}$) and an axis of astigmatism ($\gamma_{\alpha,\beta}$), each gaze direction corresponding to a lowering angle ($\alpha$) and to an azimuth angle ($\beta$), wherein the module of astigmatism and the axis of astigmatism refer to prescribed astigmatism, or total astigmatism, or residual astigmatism;

wherein the first surface of the lens has at each point a mean sphere value (SPHmean), a cylinder value (CYL) and a cylinder axis ($\gamma_{AX}$);

defining at least one first portion (Portion1) in the temporal area the first portion having an area of at least 25 mm² and at least one second portion (Portion2) in the nasal area the second portion having an area of at least 25 mm²;

for at least one of the first portion (Portion1) and the second portion (Portion2) of the first surface, determining a reference axis of astigmatism $\gamma_{ref}$ that is the average axis of astigmatism of the target optical function for gaze directions intersecting the first surface over a considered portion of the first surface;

for at least one of the first portion (Portion1) and the second portion (Portion2) of the first surface, determining a cylinder axis value $\gamma_{AXi}$ for each point i of the considered portion presenting a cylinder value greater than 0.25D, $\gamma_{AXi}$ being defined in such a way that the sphere value (SPH($\gamma_{AXi}$)) along the cylinder axis $\gamma_{AXi}$ is greater than the sphere value (SPH($\perp\gamma_{AXi}$)) along a perpendicular axis to the cylinder axis $\gamma_{AXi}$ (SPH($\gamma_{AXi}$)>SPH($\perp\gamma_{AXi}$));

for at least one of the first portion (Portion1) and the second portion (Portion2) of the first surface, determining an average cylinder axis value $\Gamma$, defined by expression (1), where N is a total number of points considered, $$\Gamma = \frac{\sum_{i=1}^{N} \gamma_{AXi}}{N}, \quad (1)$$

for at least one of the first portion and the second portion of the first surface, determining a minimum cylinder axis value Min$\Gamma$ and a maximum cylinder axis value Max$\Gamma$ among all N axis values $\gamma_{AXi}$ considered;

for at least one of the first portion and the second portion of the first surface, determining a distance value D, defined as a distance in mm between a point of the considered portion presenting the minimum axis value and a point of the considered portion presenting the maximum axis value;

for at least one of the first portion and the second portion of the first surface, determining a gradient value (Grad) of the cylinder by expression (2):

$$Grad = \frac{\text{Max}\Gamma - \text{Min}\Gamma}{D}, \qquad (2)$$

modifying the first surface so that on at least one of the first and second portions, Condition 1 and Condition 2 apply, in which in Condition 1 an average cylinder axis value $\Gamma$ determined for the respective at least one portion is between +20° and −20° of the reference axis of astigmatism $\gamma_{ref}$ for such portion, and in Condition 2, the gradient value (Grad) of the cylinder axis determined for the respective at least one portion is less than 5°/mm over the considered portion; and surfacing or molding the first surface.

13. The method of claim 1 further comprising storing at least some of the information obtained about the first surface of the lens.

14. The method of claim 6, wherein one or more of the steps of claim 6 is provided on a computer program product stored on a non-transitory computer memory and executed on a processor that when used on a computer apparatus causes the processor to carry out at least a portion of the method of claim 6.

15. The method of claim 14, wherein the computer program product is stored on a non-transitory computer readable medium that when executed by the processor on the computer apparatus causes the processor to execute at least the portion of the method of claim 6.

16. The method of claim 6 further comprising a-set of data comprising data relating to the first surface of the lens.

17. The method of claim 6 further comprising storing at least some of the information obtained about the first surface of the lens.

18. The method of claim 12 further comprising storing at least some of the information obtained about the first surface of the lens.

19. The method of claim 12 further comprising a set of data comprising data relating to the first surface of the lens.

* * * * *